US012190787B2

(12) United States Patent
Go et al.

(10) Patent No.: US 12,190,787 B2
(45) Date of Patent: Jan. 7, 2025

(54) DISPLAY DEVICE PRELIMINARY CLASS

(71) Applicant: LG Display Co., Ltd., Seoul (KR)

(72) Inventors: JaeYeong Go, Goyang-si (KR); Taegung Kim, Paju-si (KR); DongJun You, Seoul (KR); HwakDong Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/502,897

(22) Filed: Nov. 6, 2023

(65) Prior Publication Data

US 2024/0221597 A1 Jul. 4, 2024

(30) Foreign Application Priority Data

Dec. 30, 2022 (KR) ........................ 10-2022-0191207

(51) Int. Cl.
*G09G 3/20* (2006.01)

(52) U.S. Cl.
CPC ............. *G09G 3/2096* (2013.01); *G09G 3/20* (2013.01); *G09G 2310/0243* (2013.01); *G09G 2310/0267* (2013.01); *G09G 2310/0275* (2013.01); *G09G 2320/0233* (2013.01); *G09G 2320/0247* (2013.01); *G09G 2330/021* (2013.01); *G09G 2340/0435* (2013.01); *G09G 2360/02* (2013.01); *G09G 2360/12* (2013.01)

(58) Field of Classification Search
CPC ....... G09G 2340/0435; G09G 2360/02; G09G 2320/0247; G09G 3/3696; G09G 2320/0233; G09G 3/3648; G09G 2330/021; G09G 3/20; G09G 2360/12; G09G 3/2096; G09G 3/3677
See application file for complete search history.

(56) References Cited

U.S. PATENT DOCUMENTS 10,638,086 B2 4/2020 Ahn et al.
11,172,161 B2 11/2021 Ahn et al.
2016/0035306 A1* 2/2016 Park .................... G09G 3/3648 345/212
2018/0103231 A1* 4/2018 Ahn ....................... G09G 5/005
2020/0244920 A1 7/2020 Ahn et al.

FOREIGN PATENT DOCUMENTS

KR 10-2018-0039232 A 4/2018

* cited by examiner

*Primary Examiner* — Koosha Sharifi-Tafreshi
(74) *Attorney, Agent, or Firm* — Fenwick & West LLP

(57) ABSTRACT

A display apparatus includes a display panel including a plurality of pixels; a timing controller generating image data, a data control signal, and a gate control signal, based on an input image signal and an input control signal; a data driver generating a data signal for an output image based on the image data and the data control signal and supplying the data signal to the pixels; a gate driver generating a gate signal based on the gate control signal and supplying the gate signal for the output image to the pixels. The timing controller detects a frame period corresponding to a frame rate of the input image and when the detected frame period is longer than the critical period, inserts a sub frame duration to output active data for image refresh after outputting active data of an output frame duration corresponding to the output image.

20 Claims, 18 Drawing Sheets

Fa2,Fb2 : 80Hz
t: 13.889ms (f: 72Hz)
tref: 6.944ms (fref: 144Hz)
tmin: 6.944ms (fmax: 144Hz)
tmax: 25ms (fmin: 40Hz)

Fa2,Fb2 : 50Hz
t: 25ms (f: 40Hz)
tref: 18.056ms (fref: 55Hz)
tmin: 6.944ms (fmax: 144Hz)
tmax: 25ms (fmin: 40Hz)

Fa2, Fb2: 50Hz
t: 25ms (f: 40Hz)
tref: 20.833ms (fref: 48Hz)
tmin: 4.167ms (fmax: 240Hz)
tmax: 25ms (fmin: 40Hz)

DISPLAY DEVICE PRELIMINARY CLASS

CROSS-REFERENCE TO RELATED APPLICATION

This application claims the priority of Republic of Korea Patent Application No. 10-2022-0191207 filed on Dec. 30, 2022, in the Korean Intellectual Property Office, which is incorporated herein by reference in its entirety.

BACKGROUND

Field

The present disclosure relates to a display apparatus.

Description of the Related Art

As it enters an information era, a display field which visually expresses electrical information signals has been rapidly developed, and in response to this, various display devices having excellent performances such as thin-thickness, light weight, and low power consumption have been developed. Examples of such a display device include a liquid crystal display (LCD) device, an organic light emitting display (OLED) device, and the like.

The display device may include a display panel in which pixels for displaying images are disposed and a driving circuit. The driving circuit includes a data driver which supplies a data signal to data lines disposed in the display panel, a gate driver which sequentially supplies a gate signal to gate lines disposed in the display panel, and a timing controller which controls the data driver and the gate driver.

SUMMARY

An object to be achieved by the present disclosure is to provide a display apparatus which displays images at various frame rates and suppresses degradation of a luminance of a displayed image.

Objects of the present disclosure are not limited to the above-mentioned objects, and other objects, which are not mentioned above, can be clearly understood by those skilled in the art from the following descriptions.

In order to achieve the above-described objects, according to an aspect of the present disclosure, a display apparatus may include a display panel which includes a plurality of pixels: a timing controller which generates image data, a data control signal, and a gate control signal, based on an input image signal and an input control signal for an input image: a data driver which generates a data signal for an output image based on the image data and the data control signal and supplies the data signal to the pixels: a gate driver which generates a gate signal based on the gate control signal and supplies the gate signal for the output image to the pixels. The timing controller detects a frame period corresponding to a frame rate of the input image and compares the detected frame period and a critical period. When the detected frame period is longer than the critical period, the timing controller may insert a sub frame duration to output active data for image refresh after outputting active data of an output frame duration corresponding to the output image.

Other detailed matters of the exemplary embodiments are included in the detailed description and the drawings.

According to exemplary embodiments of the present disclosure, the display apparatus detects a frame period corresponding to a frame rate for an input image and compares the detected frame period (or a frame rate) of the input image and a critical period (or a critical frequency). When the detected frame period is longer than the critical period, a sub frame duration for outputting active data for image refresh may be inserted in the output frame duration. Accordingly, reduction of charges charged in the pixel during a blank period in response to various frame rates may be suppressed. In other words, the reduction in the luminance of the displayed image in accordance with the reduction in the frame rate of the input image (or increase in the frame period of the input image) may be suppressed.

The effects according to the present disclosure are not limited to the contents exemplified above, and more various effects are included in the present specification.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
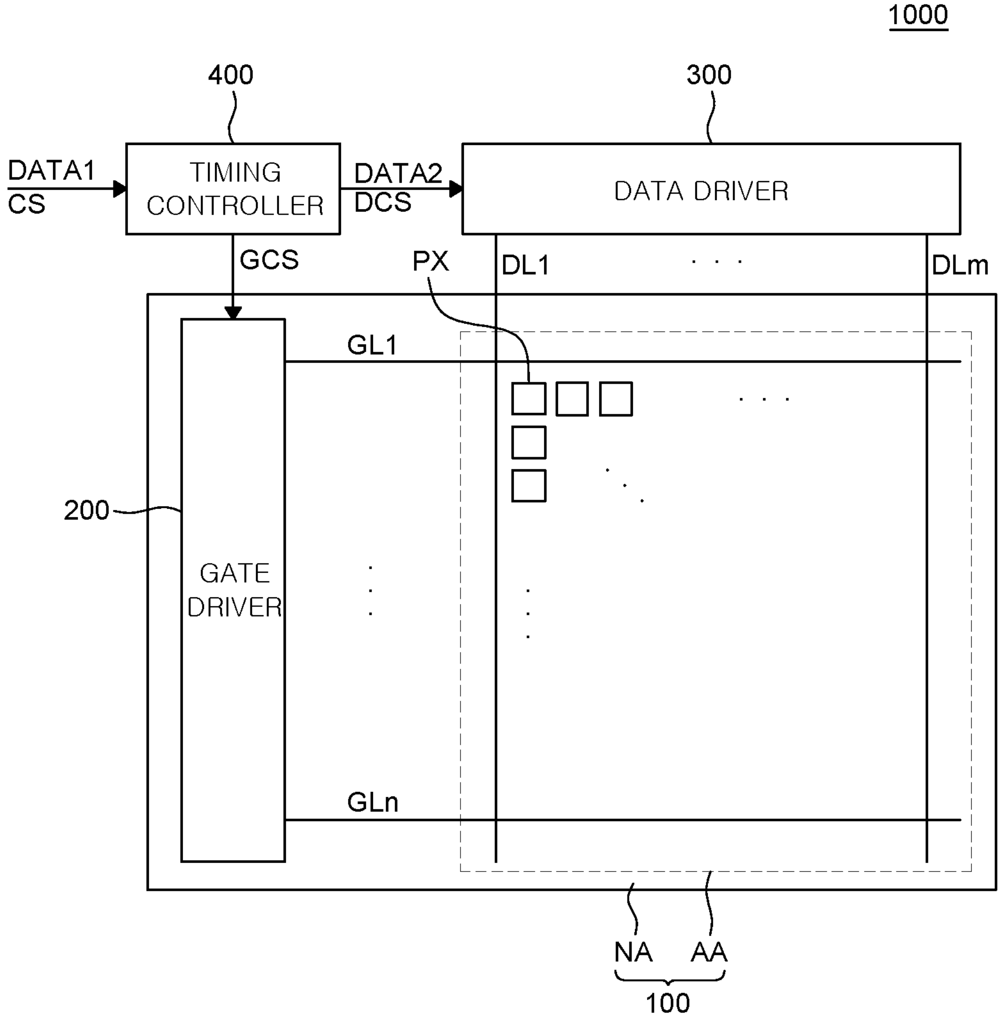
FIG. 1 is a block diagram illustrating a display apparatus according to exemplary embodiments of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

FIG. 1 is a block diagram illustrating a display apparatus according to exemplary embodiments of the present disclosure.

Referring to FIG. 1, a display apparatus 1000 according to exemplary embodiments of the present disclosure may include a display panel 100, a gate driver 200, a data driver 300, and a timing controller 400.

The display panel 100 (or a display unit or a pixel unit) may include an active area AA in which an image is displayed and a non-active area NA located at the outside of the active area AA. In the non-active area NA, various signal lines and the gate driver 200 may be disposed.

In the active area AA, a plurality of pixels PX for displaying images may be disposed. Further, in the active area AA, a plurality of gate lines GL1 to GLn (n is an integer of 0 or larger) and a plurality of data lines DL1 to DLm (m is an integer of 0 or larger) may be disposed. The gate lines GL1 to GLn are disposed in one direction and the data lines DL1 to DLm may be disposed in a direction different from one direction (for example, a direction perpendicular to one direction).

Each pixel PX may be connected to a corresponding gate line, among the gate lines GL1 to GLn and a corresponding data line, among the data lines DL1 to DLm. Therefore, a gate signal and a data signal may be applied to each pixel PX, through the gate line and the data line. Further, each of the pixels PX may implement the gray scale by the applied gate signal and data signal and finally, the image may be displayed in the active area AA by the gray scales displayed by the pixels PX.

In the non-active area NA, various signal lines and the gate driver 200 to which a signal for controlling an operation of pixels PX disposed in the active area AA is transmitted may be disposed.

The timing controller (or a timing control unit or a timing control circuit) 400 may receive an input image signal DATA1 (or, first data) and an input control signal CS from the outside (for example, a host system).

The timing controller 400 generates image data DATA2 (or second data) in accordance with an operation condition of pixels PX included in the display panel 100 based on the input image signal DATA1 to supply the image data to the data driver 300.

The timing controller 400 may generate control signals GCS and DCS for controlling the gate driver 200 and the data driver 300 based on the input control signal CS. For example, the input control signal CS may include timing signals, such as a main clock signal, a horizontal synchronization signal, a vertical synchronization signal, and a data enable signal. Here, the horizontal synchronization signal is a signal indicating a time taken to display one horizontal line and the vertical synchronization signal is a signal indicating a time taken to display a screen of one frame and distinguishes frame durations. The data enable signal is a signal indicating a period to supply a data signal to a pixel PX defined in the display panel 100. Therefore, the timing controller 400 generates a gate control signal GCS (or a first control signal) and a data control signal DCS (or a second control signal) to control operation timings of the gate driver 200 and the data driver 300 using timing signals included in the input control signal CS to supply the signals to the gate driver 200 and the data driver 300.

The gate driver 200 (or a gate driving unit, a gate driving circuit, a scan driving unit, a scan driving circuit) receives a gate control signal GCS from the timing controller 400 and sequentially supplies the gate signal to the gate lines GL1 to GLn in response to the gate control signal GCS. To this end, the gate driver 200 may include a shift register, a level shifter, or the like. The gate control signal GCS may include a gate start signal and a gate clock signal for generating gate signals. The gate start signal is a signal for controlling a timing of the gate signal and the gate clock signal may be used to shift the gate start signal.

According to an exemplary embodiment, the gate driver 200 is formed in a thin film pattern when a substrate of the display panel 100 is manufactured to be embedded on the non-active area NA in a gate in panel (GIP) manner. In the meantime, even though in FIG. 1, only one gate driver 200 is disposed on the non-active area NA of the display panel 100, this is just illustrative, but the exemplary embodiment of the present disclosure is not limited thereto. For example, two or more gate drivers 200 may be disposed on the non-active area NA of the display panel 100.

The data driver 300 (or a data driving unit or a data driving circuit) receives a data control signal DCS from the timing controller 400 and may convert image data DATA2 into an analog data signal (for example, a data voltage) in response to the data control signal DCS. The data driver 300 may output the data signal to the data lines DL1 to DLm. Specifically, the data driver 300 generates a sampling signal according to the data control signal DCS and latches image data DATA2 according to the sampling signal to be converted into the analog data signal (for example, a data voltage), and then may supply the data signal to the data lines DL1 to DLm. The data control signal DCS may include a data clock signal and a line latch signal for generating a data signal.

The display apparatus 1000 according to the exemplary embodiment of the present disclosure may display images at various frame rates (or driving frequencies, screen refresh rates, or screen scan rates) according to the driving condition. Here, the frame rate refers to a frequency at which the data signal is substantially written in the driving transistor included in the pixel PX. For example, the frame rate refers to a frequency at which the display screen is reproduced for one second. That is, the display apparatus 1000 according to the exemplary embodiment of the present disclosure may display images in response to various frame rates.

In one exemplary embodiment, in response to the frame rate of the display apparatus 1000, an output frequency of the data driver 300 for one horizontal line (or, a pixel row) and/or an output frequency of the gate driver 200 which outputs the gate signal may be determined. For example, a frame rate for driving a moving image is a frequency of approximately 60 Hz or higher (for example, 60 Hz, 72 Hz, 80 Hz, 96 Hz, 120 Hz, 240 Hz, or the like) which is relatively high frequency. As another example, a frame rate for driving a still image is a frequency of less than approximately 60 Hz (for example, 50 Hz, 40 Hz, 30 Hz, 10 Hz, 1 Hz, or the like) which is relatively low frequency.

The display apparatus 1000 may adjust an output frequency of the gate driver 200 for one horizontal line (or a pixel row) and an output frequency of the data driver 300 corresponding thereto in accordance with the driving condition.

When the frame rate of the display apparatus 1000 is changed, a length of one frame duration (or a period) may vary in response thereto. For example, when a frame rate of the display apparatus 1000 is increased, a length (or a period) of one frame duration is reduced and when the frame rate of the display apparatus 1000 is reduced, a length (or a cycle) of one frame duration may be increased.

In the meantime, one frame duration may include a display period in which active data is output and a blank period. At this time, the blank period included in one frame duration is set separately from a vertical blank duration disposed between the plurality of frames. Further, lengths of the display periods of each frame duration in which active data is output may be the same for every frame regardless of the frame rate of the display apparatus 1000. As described above, a length of the display period is the same regardless of the frame rate of the display apparatus 1000 so that when the frame rate of the display apparatus 1000 is changed, the lengths of the blank periods of the frame durations may vary. For example, when the frame rate of the display apparatus 1000 is reduced so that a length (or a period) of one frame duration is increased, in response to this, the length of the blank period of the corresponding frame may be increased.

However, when the length of the blank period is changed, a quality of the displayed image may be degraded. For example, a data signal written in the pixel PX is charged in a storage capacitor included in the pixel PX to be maintained for one frame duration. When the frame rate of the display apparatus 1000 is relatively small so that a length of the blank period of the corresponding frame is increased, the charges charged in the storage capacitor may be reduced due to the leakage current of the pixel PX. As described above, when the length of the blank period is increased, the longer the length of the blank period, the worse the luminance of the image displayed by the pixel PX. In this case, the user may perceive the flicker from the displayed image.

With regard to this, the display apparatus 1000 according to the exemplary embodiments of the present disclosure detects a frame period corresponding to a frame rate for an input image (for example, an input image corresponding to an input image signal DATA1). The display apparatus 1000 compares the detected frame period (or the frame rate) of the input image and a critical period (or a critical frequency). When the detected frame period of the input image is longer than the critical period (or the detected frame frequency of the input image is lower than the critical frequency), the display apparatus 1000 inserts a sub frame duration for outputting active data (or image data) for image refresh. Here, active data (or image data) for image refresh may be active data corresponding to a display image of the corresponding frame. According to the exemplary embodiment, the display apparatus 1000 detects and compares a frame duration of an input image detected while the frame duration of the output image is driven and the critical period to output the active data for image refresh of the output image without causing the delay. As described above, the display apparatus 1000 according to the exemplary embodiments of the present disclosure may suppress the reduction of charges charged in the pixel PX during the blank period by additionally inserting a sub frame duration for outputting active data according to the frame rate of the input image. Accordingly, the degradation in the luminance of the displayed image in accordance with the reduction in the frame rate of the input image (or increase in the frame period of the input image) may be suppressed.

In the meantime, the critical period (or a critical frequency) may be a period (or, frequency) which is a reference for perceiving the flicker of the display image. The critical period (or a critical frequency) may be determined by a predetermined value before shipment of the display apparatus 1000 or may be a value arbitrarily selected by the user, but the exemplary embodiment of the present disclosure is not limited thereto.

Figure 2:
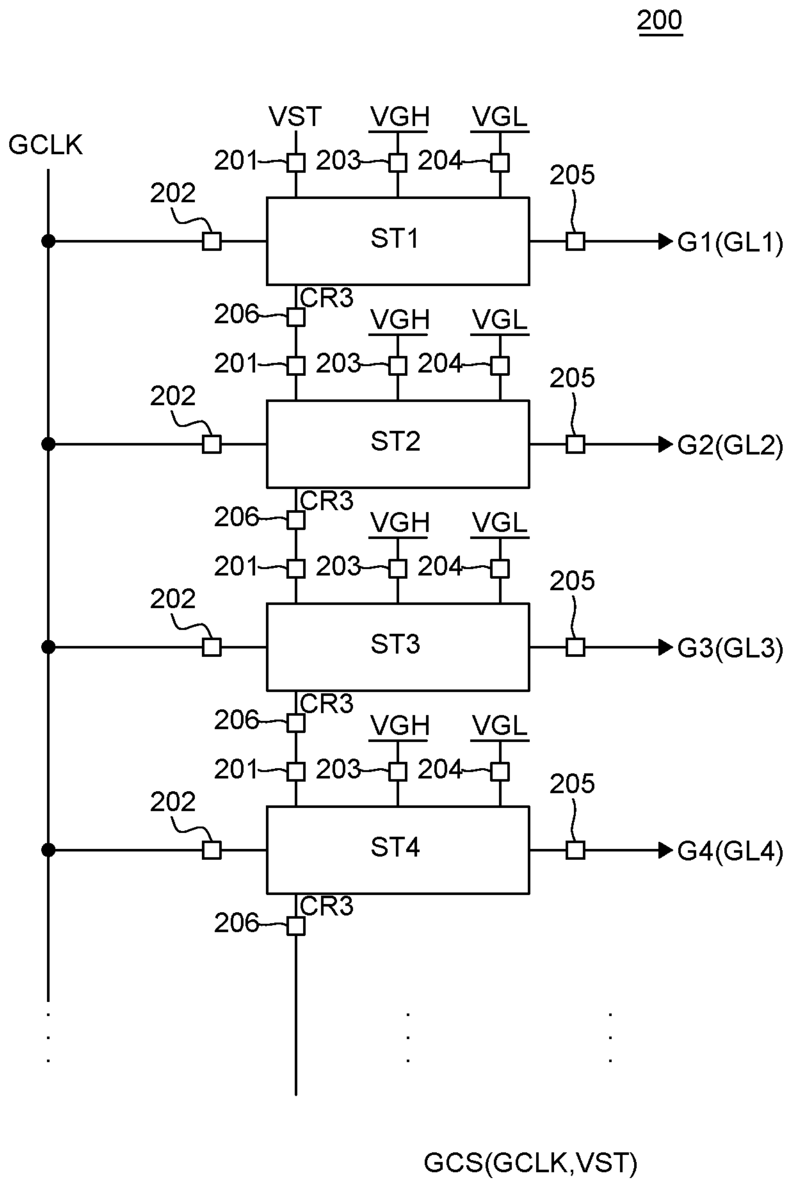
FIG. 2 is a block diagram illustrating an example of a gate driver included in a display apparatus of FIG. 1 according to exemplary embodiments of the present disclosure.

FIG. 2 is a block diagram illustrating an example of a gate driver included in a display apparatus of FIG. 1.

In the meantime, for the convenience of description, in FIG. 2, among n stages included in the gate driver 200, four stages ST1 to ST4 and gate signals G1 to G4 output from the stages are illustrated.

Referring to FIGS. 1 and 2, the gate driver 200 may include a plurality of stages ST1 to ST4. The stages ST1 to ST4 are connected to corresponding gate lines GL1 to GL4 and output gate signals G1 to G4 in response to the gate clock signal GCLK.

In one exemplary embodiment, the plurality of stages ST1 to ST4 included in the gate driver 200 may be cascaded.

For example, the second stage ST2 is cascaded to the first stage ST1, the third stage ST3 is cascaded to the second stage ST2, and the fourth stage ST4 is cascaded to the third stage ST3. Here, the plurality of stages ST1 to ST4 may have the substantially same configuration.

Each of the stages ST1 to ST4 may include a first input terminal 201, a second input terminal 202, a first power input terminal 203, a second power input terminal 204, a first output terminal 205, and a second output terminal 206.

The first input terminal 201 of each of the stages ST1 to ST4 may receive an input signal. For example, the first input terminal 201 of the first stage ST1 may receive a gate start signal VST. Further, the first input terminal 201 of each of second to fourth stages ST2 to ST4 may receive carry signals (that is, one of first to third carry signals CR1 to CR3) output from the second output terminal 206 of a previous stage. For example, the first input terminal 201 of the second stage ST2 receives a first carry signal CR1 output from the second output terminal 206 of the first stage ST1. The first input terminal 201 of the third stage ST3 receives a second carry signal CR2 output from the second output terminal 206 of the second stage ST2. The first input terminal 201 of the fourth stage ST4 may receive a third carry signal CR3 output from the second output terminal 206 of the third stage ST3.

A gate clock signal GCLK may be supplied to the second input terminal 202 of each of the stages ST1 to ST4. For example, the gate clock signal GCLK includes a plurality of gate clock signals which have the same period and have waveforms whose phases do not overlap, and corresponding gate clock signals, among the plurality of gate clock signals, may be supplied to the second input terminal 202 of each of the stages ST1 to ST4.

Voltages of power sources required to drive the stages ST1 to ST4 are applied to the first and second power input terminals 203 and 204 of the stages ST1 to ST4.

For example, a voltage of the first power source VGH is applied to the first power input terminal 203 of each of the stages ST1 to ST4 and a voltage of the second power source VGL is applied to the second power input terminal 204 of each of the stages ST1 to ST4. A voltage of the first power source VGH and a voltage of the second power source VGL have a DC voltage level. Here, a voltage level of the first power source VGH may be set to be higher than a voltage level of the second power source VGL.

Gate signals GL1 to GL4 may be output to the first output terminals 205 of the stages ST1 to ST4. In one exemplary embodiment, the gate signals G1 to G4 output to the first output terminals 205 may be supplied to the gate lines GL1 to GL4.

Further, carry signals CR1 to CR4 are output to the second output terminals 206 of the stages ST1 to ST4 to be supplied to the first input terminals 201 of the subsequent stage. For example, a first carry signal CR1 output from the second output terminal 206 of the first stage ST1 is supplied to the first input terminal 201 of the second stage ST2. A second carry signal CR2 output from the second output terminal 206 of the second stage ST2 is supplied to the first input terminal 201 of the third stage ST3. A third carry signal CR3 output from the second output terminal 206 of the third stage ST3 may be supplied to the first input terminal 201 of the fourth stage ST4.

In one exemplary embodiment, the stages ST1 to ST4 included in the gate driver 200 may have the substantially same configuration, excluding a type of a signal which is received through the first input terminal 201. For example, the first stage ST1 which is an initial stage which receives the gate start signal VST through the first input terminal 201 and the remaining stages (for example, second to fourth stages ST2 to ST4) which receive the carry signal of the previous stage through the first input terminal 201 have the substantially same circuit configuration excluding an input signal (that is, the gate start signal VST or a carry signal of the previous stage) which is received through the first input terminal 201 and operate in the substantially same way.

In the meantime, the gate control signal GCS which is supplied to the gate driver 200 described with reference to FIG. 1 may include a gate clock signal GCLK and a gate start signal VST.

Figure 3:
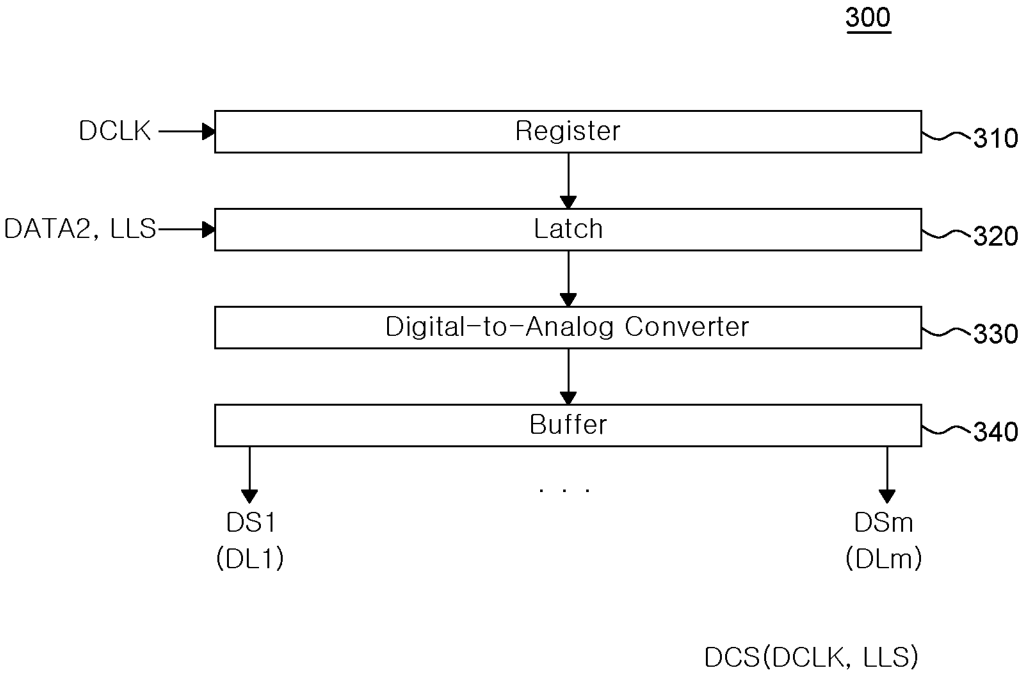
FIG. 3 is a block diagram illustrating an example of a data driver included in a display apparatus of FIG. 1 according to exemplary embodiments of the present disclosure.

FIG. 3 is a block diagram illustrating an example of a data driver included in a display apparatus of FIG. 1.

Referring to FIGS. 1 and 3, the data driver 300 may include a register unit 310, a latch unit 320, a digital-to-analog converter 330, and a buffer unit 340.

The register unit 310 sequentially activates the latch clock signals in synchronization with the data clock signal DCLK to be supplied to the latch unit 320. For example, the register unit 310 may include a plurality of shift registers.

The latch unit 320 receives latch clock signals which are sequentially supplied from the register unit 310 and may sample and latch digital image data DATA2 (or second data) in synchronization with the latch clock signals. Further, the latch unit 320 may supply the latched digital image data DATA2 to the digital-to-analog converter 330 in response to a line latch signal LLS.

The digital-to-analog converter 330 may convert the digital image data DATA2 supplied from the latch unit 320 into an analog signal. For example, the digital-to-analog converter 330 converts the digital image data DATA2 using a reference voltage into an analog signal, that is, a grayscale voltage to supply the converted analog signal to the buffer unit 340 as data signal (data voltage).

For example, the digital-to-analog converter 330 may include a voltage generator and a decoder. The voltage generator may generate a plurality of gamma voltages to express a predetermined gray scale using a reference voltage. For example, the voltage generator divides the reference voltage to generate gamma voltages, using a plurality of registers connected in series between the reference voltage and a ground voltage. The decoder receives a plurality of gamma voltages from the voltage generator and may output a corresponding gamma voltage, among gamma voltages, in accordance with the input image data DATA2, to the buffer unit 340 as a data signal (data voltage).

The buffer unit 340 may output the data signals DS1 to DSm output from the digital-to-analog converter 330 to corresponding data lines DL1 to DLm.

In the meantime, the data control signal DCS which is supplied to the data driver 300 described with reference to FIG. 1 may include a data clock signal DCLK and a line latch signal LLS.

Figure 4:
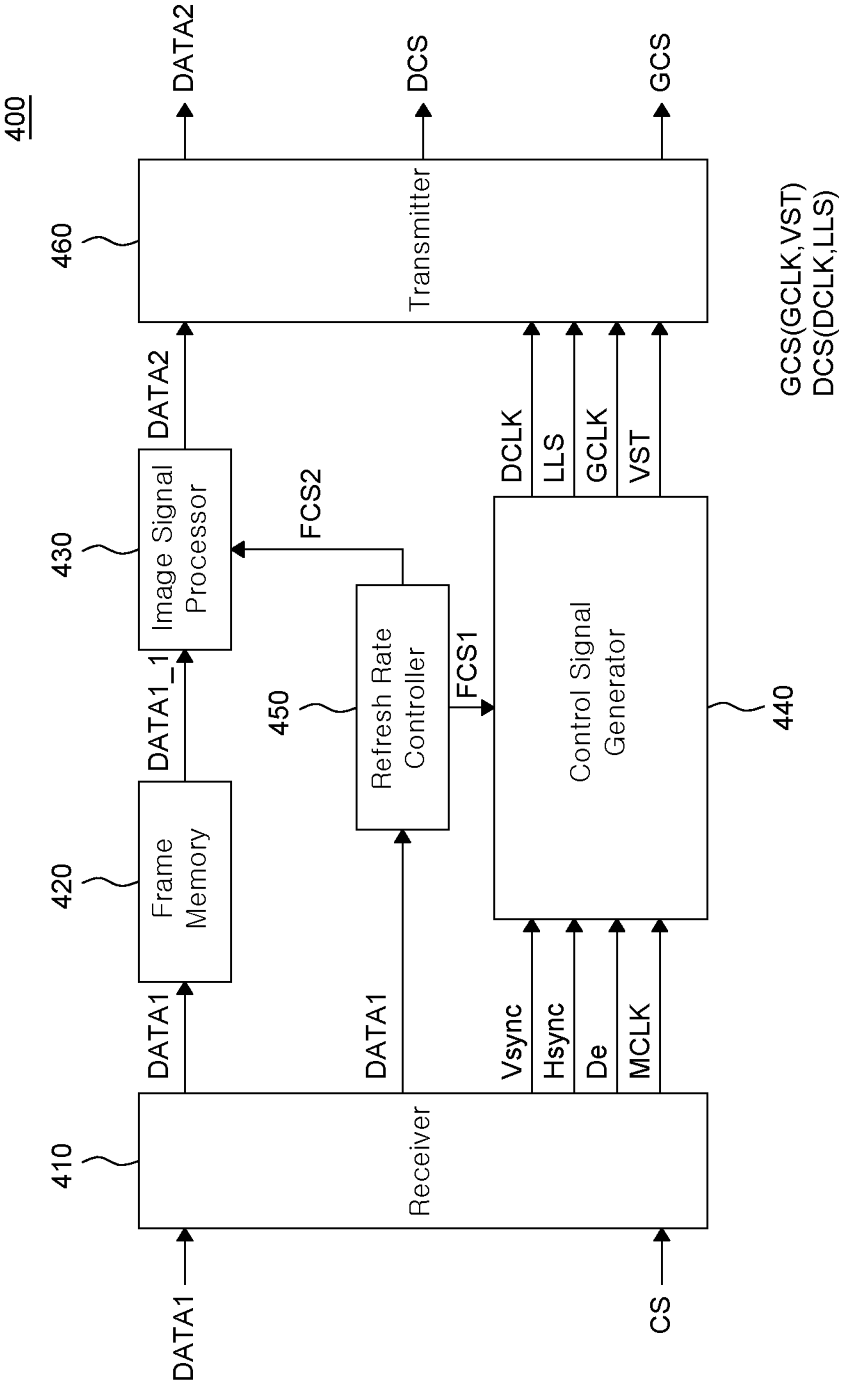
FIG. 4 is a block diagram illustrating an example of a timing controller included in a display apparatus of FIG. 1 according to exemplary embodiments of the present disclosure.

FIG. 4 is a block diagram illustrating an example of a timing controller included in a display apparatus of FIG. 1.

Figure 5:
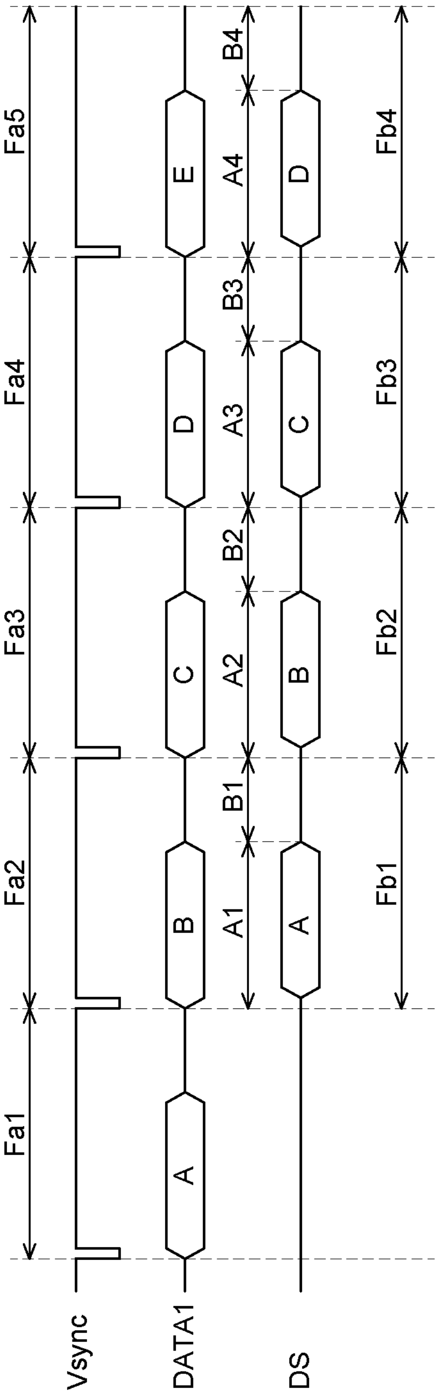
FIG. 5 is a view for explaining an example of an operation of a frame memory included in a timing controller of FIG. 4 according to exemplary embodiments of the present disclosure.

FIG. 5 is a view for explaining an example of an operation of a frame memory included in a timing controller of FIG. 4.

Referring to FIGS. 1 and 4, the timing controller 400 may generate and output a gate control signal GCS (or a first control signal) to control the gate driver 200 and image data DATA2 (or second data) and a data control signal DCS (or a second control signal) to control the data driver 300, based on an input image signal DATA1 (or, first data) and an input control signal CS received from the outside (for example, the host system).

In one exemplary embodiment, the timing controller 400 may include a receiver 410, a frame memory 420, an image signal processor 430, a control signal generator 440, a refresh rate controller 450, and a transmitter 460.

The receiver 410 may receive the input image signal DATA1 and the input control signal CS from the outside. The receiver 410 may supply the input image signal DATA1 to the frame memory 420. Further, the receiver 410 generates (or restores) a vertical synchronization signal Vsync, a horizontal synchronization signal Hsync, a main clock signal MCLK, and a data enable signal DE based on the input control signal CS to supply the signals to the control signal generator 440. Further, the receiver 410 may supply the vertical synchronization signal Vsync to the refresh rate controller 450.

The frame memory 420 delays the input image signal DATA1 supplied from the receiver 410 by a predetermined period (for example, one frame period) to generate the delayed input image signal DATA1_1. This will be described in more detail below with reference to FIG. 5. In the meantime, for the convenience of description, in FIG. 5, it is described that each of input frame periods Fa1 to Fa5 has the same frame rate. That is, the vertical synchronization signal Vsync which is included in the input control signal CS and distinguishes the input frame periods Fa1 to Fa5 has the same period.

Further referring to FIG. 5, the input image signal DATA1 received from the outside may include active data A, B, C, D, and E corresponding to input frame periods Fa1 to Fa5, respectively.

In one exemplary embodiment, the frame memory 420 may delay the active data A, B, C, D, and E included in the input image signal DATA1 by a predetermined duration (for example, one frame duration) to output the delayed active data. For example, the data signal DS generated by the image data DATA2 which is finally output from the timing controller 400 based on the input image signal DATA1_1 which is delayed and output by the frame memory 420 may include active data A, B, C, and D corresponding to output frame periods Fb1 to Fb4, respectively. Here, active data A, B, C, and D corresponding to output frame periods Fb1 to Fb4 may be delayed from active data A, B, C, D, and E corresponding to the input frame periods Fa1 to Fa5 by a predetermined period (for example, one frame period). That is, a first output frame duration Fb1 is delayed by one frame duration from the first input frame duration Fa1, a second output frame duration Fb2 is delayed by one frame duration from the second input frame duration Fa2, a third output frame duration Fb3 is delayed by one frame duration from the third input frame duration Fa3, and a fourth output frame duration Fb4 may be delayed by one frame duration from the fourth input frame duration Fa4.

In the meantime, as illustrated in FIG. 5, the output frame durations Fb1 to Fb4 may include display periods A1 to A4 in which the active data A, B, C, and D (or image data) is output and blank periods B1 to B4 which are the other periods.

In the meantime, as described with reference to FIG. 1, lengths (or lengths of input frame durations Fa1 to Fa5) of the active data A, B, C, and D included in the output frame durations Fb1 to Fb4 may be the same.

Referring to FIG. 4 again, the image signal processor 430 converts the delayed image signal DATA1_1 into image data DATA2 to output the converted image data. For example, the image signal processor 430 linearizes the gamma characteristic of the image signal DATA1_1 to be proportional to the luminance to generate the image data DATA2.

The control signal generator 440 receives the input control signal CS, that is, the vertical synchronization signal Vsync, the horizontal synchronization signal Hsync, the data enable signal DE, and the main clock signal MCLK. The control signal generator may generate and output a data clock signal DCLK, a line latch signal LLS, a gate clock signal GCLK, and a gate start signal VST based on the input control signal.

The refresh rate controller 450 may detect a frame rate (or a frame period) for the input image (for example, an input image corresponding to the input image signal DATA1) based on the input image signal DATA1 and the input control signal CS. For example, the refresh rate controller 450 detects a start point and an end point of the input frame duration of the input image to detect the frame duration for the input frame duration of the corresponding input image. Further, the refresh rate controller 450 compares the frame rate (or the frame period) of the detected input image and the critical period (or a critical frequency). When the frame period corresponding to the frame rate of the detected input image is longer than the critical period (or the frame rate of the detected input image is lower than the critical frequency), in order to display the output image for the input image, the refresh rate controller may generate frequency control signals FCS1 and FCS2. The frequency control signals are signals controlled to insert the sub frame duration for outputting the active data for image refresh in the output frame. For example, the refresh rate controller 450 divides the output frame period into a plurality of sub frame durations and may generate the frequency control signals FCS1 and FCS2 controlled to output the active data for image refresh in each of the sub frame durations.

In the meantime, the first frequency control signal FCS1 and the second frequency control signal FCS2 supplied from the refresh rate controller 450 may be supplied to the control signal generator 440 and the image signal processor 430, respectively. Here, as described above, when the refresh rate controller 450 are controlled to additionally insert the sub frame duration for outputting the active data for the image refresh into the corresponding output frame duration, the control signal generator 440 and the image signal processor 430 may be controlled by the first frequency control signal FCS1 and the second frequency control signal FCS2.

For example, the image signal processor 430 is controlled by the second frequency control signal FCS2 to additionally output the image data DATA and/or the control signal generator 440 may be controlled by the first frequency control signal FCS1 to additionally output the gate control signal GCS and the data control signal DCS. For example, as described above, when the output frame duration includes a plurality of sub frame durations, in each of the plurality of sub frame durations, including an initial sub frame duration, the control signal generator 440 is controlled by the first frequency control signal FCS1 to output the gate control signal GCS and the data control signal DCS. Further, the image signal processor 430 may be controlled by the second frequency control signal FCS2 to output the image data DATA2. As described above, the gate driver 200 and the data driver 300 may be controlled by the image data DATA2, the gate control signal GCS, and the data control signal DCS which are additionally output in the sub frame durations, to additionally supply the gate signal and the data signal to the pixel PX in each sub frame duration. A specific operation of the refresh rate controller 450 will be described with reference to FIGS. 6, 7A to 7C.

The transmitter 460 may output image data DATA2 supplied from the image signal processor 430 and a data clock signal DCLK, a line latch signal LLS, a gate clock signal GCLK, and a gate start signal VST which are supplied from the control signal generator 440. For example, the transmitter 460 supplies the gate control signal GCS (for example, the gate clock signal GCLK and the gate start signal VST) to the gate driver 200 and may supply the image data DATA2 and the data control signal DCS (for example, the data clock signal DCLK and the line latch signal LLS) to the data driver 300.

Figure 6:
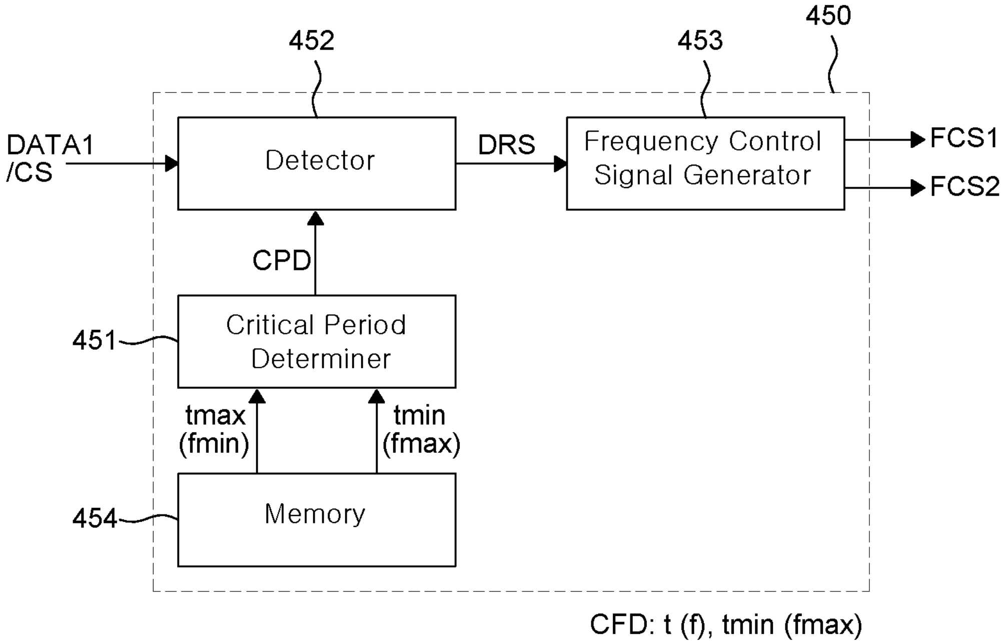
FIG. 6 is a block diagram illustrating an example of a refresh rate controller included in a timing controller of FIG. 4 according to exemplary embodiments of the present disclosure.

FIG. 6 is a block diagram illustrating an example of a refresh rate controller included in a timing controller of FIG. 4.

In the meantime, hereinafter, for the convenience of description, it will be mainly described that the refresh rate controller 450 determines based on a period value to generate the frequency control signals FCS1 and FCS2. However, this is an example and those skilled in the art may implement an exemplary embodiment to be described below in the same way by replacing the period with the frequency.

Referring to FIGS. 1, 4, and 6, the refresh rate controller 450 may include a critical period determiner 451, a detector 452, and a frequency control signal generator 453. In one exemplary embodiment, the refresh rate controller 450 may further include a memory 454.

The critical period determiner 451 (or a critical frequency determining unit) determines a critical period t (or a critical frequency f) to generate critical period information (CPD) (or critical frequency information). Here, as described with reference to FIG. 4, the critical period t (or a critical frequency f) may correspond to a reference period (or frequency) to determine whether to additionally insert active data for the image refresh.

For example, when the display apparatus 1000 is driven at a frame rate between a maximum frequency fmax and a minimum frequency fmin (that is, a driving rate of the frame rate of the display apparatus 1000 is equal to or lower than the maximum frequency fmax and equal to or higher than the minimum frequency fmin), a period of one frame driven by the display apparatus 1000 may be between the maximum frequency fmax and the minimum frequency fmin. In the meantime, the minimum period tmin is a reciprocal number of the maximum frequency fmax (that is, tmin=1/fmax) and the maximum period tmax is a reciprocal number of the minimum frequency (that is, tmax=1/fmin).

Here, as described above, in order to insert the additional active data, data signal for active data needs to be applied to the pixels PX at least two times, during one frame duration. As described above, in order to apply the data signal for active data two times, the critical period t needs to be twice or more than the minimum period tmin (that is, t≥2*tmin). To be more specific, in order to suppress the visible recognition of the flicker, when the refresh rate controller 450 (or the display apparatus 1000) outputs the active data in each sub duration period by dividing one sub frame duration into a plurality of sub frame durations, the minimum period of each sub frame duration may be equal to the minimum period tmin according to the driving range of the frame rate of the display apparatus 1000. Accordingly, when the active data is additionally inserted, one frame duration includes at least two sub frame durations and a minimum period of each sub frame duration is equal to the minimum period tmin of the display apparatus 1000. Accordingly, the critical period t which is a reference for inserting the additional active may be twice or longer than the minimum period tmin. Accordingly, the critical period t may be twice or longer than the minimum period tmin and may be equal to or shorter than the maximum period tmax (that is, 2*tmin≤t≤tmax). In other words, the critical frequency f corresponding to the critical period t may be equal to or longer than the minimum frequency fmin and equal to or shorter than half of the maximum frequency fmax (that is, fmin≤f≤fmax/2).

Accordingly, the critical period determiner 451 determines the critical period t within the above-mentioned range to generate critical period information CPD including information about the critical period t and the minimum period tmin.

In the meantime, the critical period determiner 451 may be supplied with values of the maximum period tmax and the minimum period tmin required to determine the critical period t from the memory 454.

In the meantime, the critical period t may correspond to a reference period which suppresses the flicker from being perceived by a user when the display apparatus 1000 is driven at a relatively low frame rate.

According to the exemplary embodiment, the critical period determiner 451 may determine the critical period t according to the display image within the range. For example, the critical period determiner 451 may determine the critical period t so as not to perceive the flicker depending on whether the display image is a moving image or a still image.

However, this is just an example, but the configuration of determining the critical period t is not limited thereto. For example, the critical period t may correspond to a value set in advance within the range. Here, when the critical period t is a predetermined value, the critical period determiner 451 is configured as one configuration together with the memory 454 to store and output critical period information CPD including information about the critical period t and the minimum period tmin as a memory. As another example, the critical period t may be selected by the user within the range and the critical period t may be determined by the selection of the user.

The detector 452 receives the input image signal DATA1 and the input control signal CS from the receiver 410 and may receive the critical period information CPD from the critical period determiner 451.

In one exemplary embodiment, the detector 452 may detect a frame period corresponding to the frame rate of the input image based on the input image signal DATA1 and the input control signal CS. For example, the detector 452 may detect a frame rate of the input image based on the start point and the end point of the input frame duration.

For example, the detector 452 detects the frame rate of the input image based on the vertical synchronization signal Vsync included in the input control signal CS and may detect a corresponding frame period. For example, the detector 452 counts a pulse of the vertical synchronization signal Vsync included in the input control signal CS and may detect a frame period of the input image based on an interval between the pulses included in the vertical synchronization signal Vsync. For example, when the pulse of the vertical synchronization signal Vsync is detected after the start time of the input frame duration, the detector 452 determines the pulse as the end point of the input frame duration to detect the frame period of the input image. According to the exemplary embodiment, the detector 452 may include a counter for counting the number of pulses.

As another example, the detector 452 may detect the frame rate of the input image based on the input image signal DATA1. For example, after a timing when the active data corresponding to the current frame is applied, the detector 452 detects a timing when the active data corresponding to a subsequent frame is applied to detect the frame rate of the input image corresponding to the current frame and detect a frame period corresponding thereto. For example, the detector 452 determines a timing when the active data corresponding to a subsequent frame is applied after the start point of the input frame duration, as the end point of the input frame duration to detect the frame period of the input image. For example, the input image signal DATA1 and the input control signal CS are transmitted to the timing controller 400 as one packet data through a serial interface from the outside. At this time, the detector 452 detects the frame rate of the input image and a frame period corresponding thereto, using a timing when a packet including the active data is detected from the packet data supplied from the receiver 410.

However, this is just illustrative, but a configuration that the detector 452 detects a frame period corresponding to the frame rate of the input image based on the input image signal DATA1 and/or the input control signal CS is not limited thereto.

Further, in one exemplary embodiment, the detector 452 may compare the frame period (or frame rate) of the detected input image and the critical period t (or the critical frequency f). According to the exemplary embodiment, the frame period of the detected input image is longer than the critical period t (or, the frame frequency of the detected input image is lower than the critical frequency f). At this time, the detector 452 may generate and output the detection result signal DRS to additionally insert the active data for the image refresh. In contrast, when the frame period of the detected input image is shorter than the critical period t (or the frame frequency of the detected input image is lower than the critical frequency f), even though the output image is driven so as to correspond to the frame rate of the input image, the user may not perceive the flicker. Therefore, the detector 452 may generate and output the detection result signal DRS so as not to additionally insert the active data for the image refresh.

The frequency control signal generator 453 receives the detection result signal DRS from the detector 452. The frequency control signal generator 453 may generate and output the first frequency control signal FCS1 for controlling the control signal generator 440 and the second frequency control signal FCS2 for controlling the image signal processor 430 based on the detection result signal DRS.

Hereinafter, the operation of the above-described refresh rate controller 450, specifically, an operation of the detector 452 will be described in more detail with reference to FIGS. 7A to 7C.

Figure 7A:
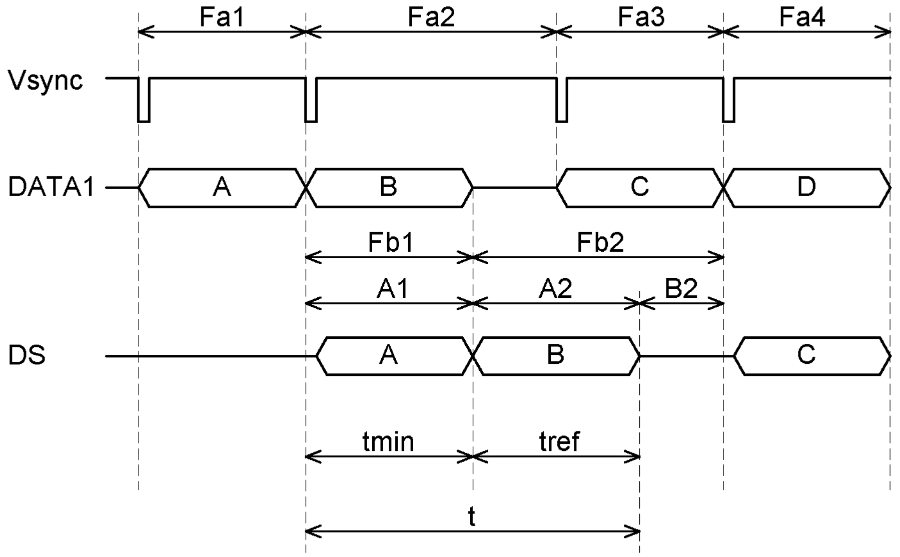
FIGS. 7A to 7C are views for explaining an example of an operation of a timing controller of FIG. 4 according to exemplary embodiments of the present disclosure.
Figure 7B:
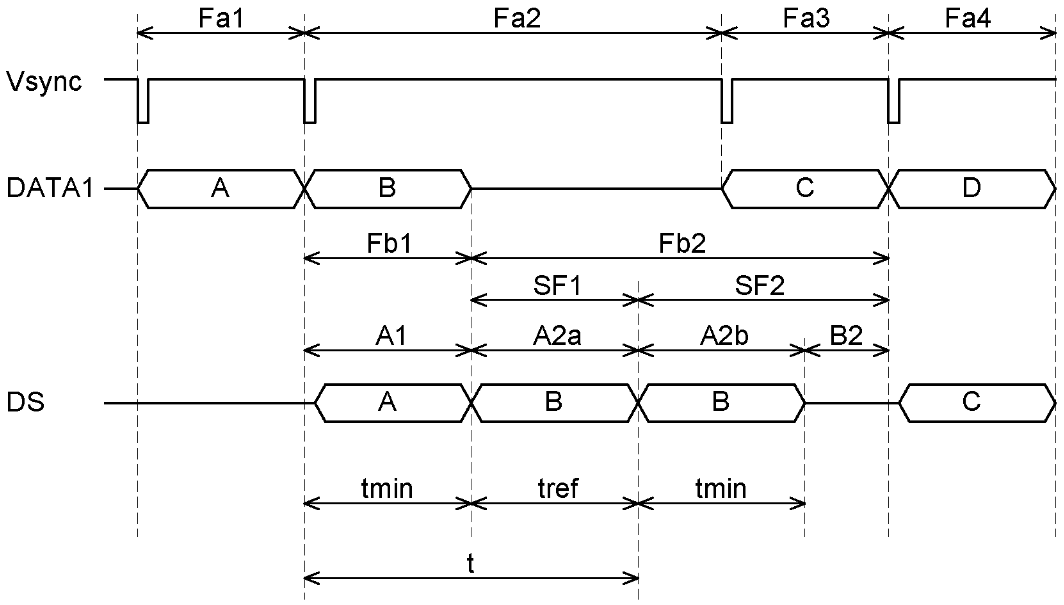
Figure 7C:
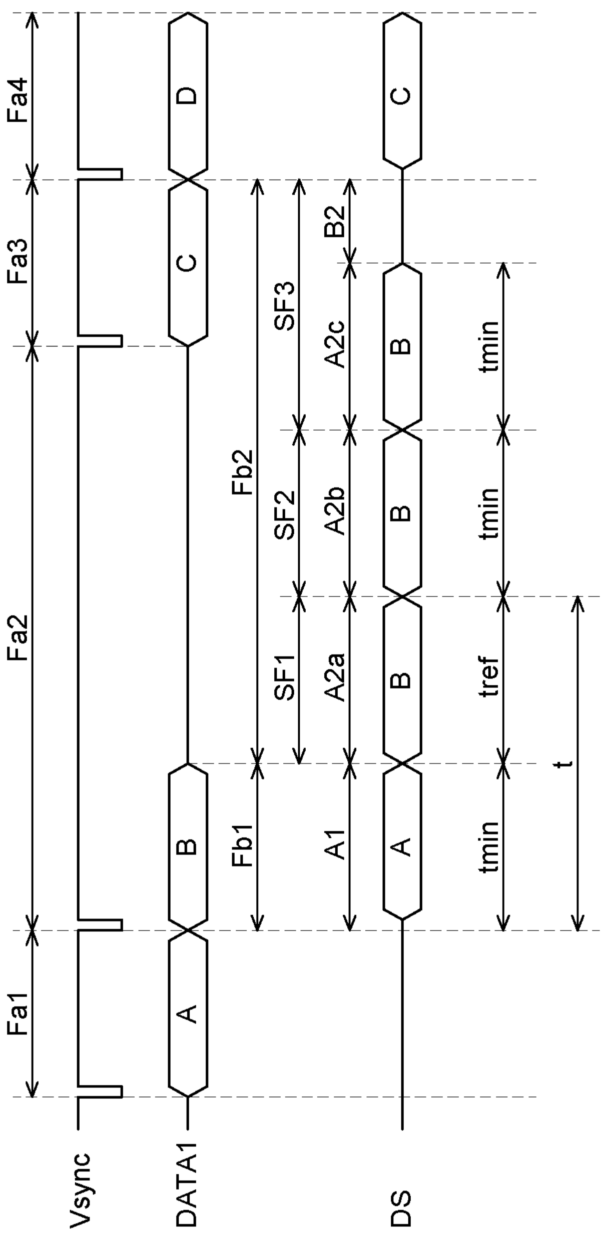

FIGS. 7A to 7C are views for explaining an example of an operation of a timing controller of FIG. 4.

In the meantime, in FIGS. 7A to 7C, the vertical synchronization signal Vsync and the input image signal DATA1 corresponding to the input frame durations Fa1, Fa2, Fa3, and Fa4 of the input image and the data signal DS corresponding to the output frame durations Fb1 and Fb2 of the output image are illustrated.

In the meantime, for the convenience of description, in FIGS. 7A to 7C, it will be described that the display apparatus 1000 is driven at the maximum frequency fmax in the first input frame duration Fa1 with respect to the input frame durations Fa1, Fa2, Fa3, and Fa4 of the input image and the frame frequency of the display apparatus 1000 varies in the second input frame duration Fa2 after the first input frame duration Fa1.

In the meantime, as described with reference to FIG. 5, the output frame durations Fb1 and Fb2 of the output image may be delayed by a predetermined duration from input frame durations Fa1, Fa2, Fa3, and Fa4 of the input image, by the operation of the frame memory 420 of the timing controller 400. In other words, active data A, B, C, and D of the data signal DS may be output to be delayed from the active data A, B, C, and D of the input image signal DATA1 by a predetermined duration.

In the meantime, in FIGS. 7A to 7C, for the convenience of description, the description will be mainly described with regard to a period value. However, this is just illustrative as described above so that those skilled in the art may implement an exemplary embodiment to be described below in the same way by replacing the period into the frequency.

Referring to FIGS. 1, 4, 6, 7A, 7B, and 7C, the critical period determiner 451 may determine the critical period t based on the maximum period tmax and the minimum period tmin of the display apparatus 1000.

Further, the detector 452 detects a frame period of the input image for the second input frame duration Fa2 in which the frame rate varies based on the input image signal DATA1 for the input image and/or the input control signal CS. The detector compares the frame period of the input image with the critical period t to detect whether the frame period of the input image for the second input frame period Fa2 is longer than the critical period t or shorter than the critical period.

For example, as described with reference to FIG. 6, the detector 452 may detect the end point of the second input frame duration Fa2 using whether the active data C of the third input frame duration Fa3 after the second input frame duration Fa2 is input, during the period of the critical period t.

As another example, as described with reference to FIG. 6, the detector 452 may detect the end point of the second input frame duration Fa2 using whether the pulse of the vertical synchronization signal Vsync of the third input frame duration Fa3 after the second input frame duration Fa2 is input, during the period of the critical period t.

In the meantime, when the length of the critical period t is determined, a minimum length (denoted by tref in FIGS. 7A to 7C) of the output frame duration (for example, the second output frame duration Fb2) corresponding to the input frame duration (for example, the second input frame duration Fa2) may be determined. For example, the length of the corresponding duration (denoted by tref in FIGS. 7A to 7C) may correspond to a value obtained by subtracting a length of the minimum period tmin for outputting the active data from the length of the critical period t.

In the meantime, the minimum length (denoted by tref in FIGS. 7A to 7C) of the output frame duration (for example, the second output frame duration Fb2) corresponding to the input frame duration (for example, the second input frame duration Fa2) is set to be relatively long. At this time, the insertion of the active data for image refresh is reduced so that it is more advantageous for the power consumption. In contrast, the minimum length (denoted by tref in FIGS. 7A to 7C) of the output frame duration (for example, the second output frame duration Fb2) corresponding to the input frame duration (for example, the second input frame duration Fa2) is set to be relatively short. At this time, the insertion of the active data for image refresh is increased so that it is more advantageous for the degradation of the luminance.

Here, as illustrated in FIG. 7A, the active data C of the third input frame duration Fa3 after the second input frame duration Fa2 is input during the period of the critical period t (that is, when an end point of the second input frame duration Fa2 is detected during the critical period t). At this time, the detector 452 may determine (or detect) that the length of the second input frame duration Fa2 is shorter than the length of the critical period t. In this case, even though the output image is driven so as to correspond to the frame rate of the input image, the flicker is not perceived by the user. Therefore, the detector 452 may generate and output a detection result signal DRS so as not to insert the active data for the image refresh. Accordingly, the frequency control signal generator 453 may generate and output the frequency control signals FCS1 and FCS2 to control the active data so as not to be additionally output based on the detection result signal DRS. However, this is illustrative so that, as illustrated in FIG. 7A, the length of the second input frame duration Fa2 is detected to be shorter than the length of the critical period t. At this time, the frequency control signal generator 453 may be controlled so as not to generate separate frequency control signals FCS1 and FCS2 based on the detection result signal DRS.

As described above, a length of the second input frame duration Fa2 in which the frame rate of the display apparatus 1000 varies is detected to be shorter than the length of the critical period t (that is, the end point of the second input frame duration Fa2 is detected during the critical period t). At this time, the second output frame duration Fb2 may be driven in the same way as the second input frame duration Fa2. For example, the data signal DS may be generated and output so that the second output frame duration Fb2 includes a display period A2 in which the active data B is output and the blank period B2. In the meantime, the first output frame duration Fb1 may include the display period A1 in which the active data A is output.

In contrast, as illustrated in FIG. 7B, the active data C of the third input frame duration Fa3 after the second input frame duration Fa2 is not input during the critical period t (that is, when an end point of the second input frame duration Fa2 is not detected during the critical period t). At this time, the detector 452 may determine (or detect) that the length of the second input frame duration Fa2 is longer than the length of the critical period t. In this case, when the output image is driven so as to correspond to the frame rate of the input image, the flicker is perceived by the user.

Accordingly, the detector 452 may generate and output the detection result signal which controls the active data for the image refresh to be additionally inserted. Accordingly, the frequency control signal generator 453 may generate and output the frequency control signals FCS1 and FCS2 for outputting the additional active data, based on the detection result signal DRS.

Thereafter, the detector 452 may detect whether the active data C of the third input frame duration Fa3 after the second input frame duration Fa2 is additionally input during a duration corresponding to the minimum period tmin after the duration of the critical period t. Here, as illustrated in FIG. 7B, the active data C of the third input frame duration Fa3 after the second input frame duration Fa2 is input in the duration corresponding to the minimum period tmin after the duration of the critical period t. That is, an end point of the second input frame duration Fa2 is detected during the duration corresponding to the minimum period tmin of the critical period t after the duration of the critical period t. In this case, the detector 452 may generate and output the detection result signal DRS so as not to additionally insert the active data for the image refresh.

For example, as illustrated in FIG. 7B, the second output frame duration Fb2 may include a first sub frame duration SF1 and a second sub frame duration SF2. Here, the first sub frame duration SF1 is a duration in which the active data B is initially output in the second output frame duration Fb2 and may have a minimum length (denoted by tref in FIG. 7B) of the second output frame duration Fb2. For example, the first sub frame duration SF1 may include a display period A2*a* in which the active data B of the second output frame duration Fb2 is output. Further, the second sub frame duration SF2 is a duration in which the active data B is additionally output in the second output frame duration Fb2 in accordance with the insertion of the active data after the first sub frame duration SF1. Therefore, the second sub frame duration may include a display period A2*b* in which active data B of the second output frame duration Fb2 is output and a blank period B2.

In the meantime, as described above, even though the active data is inserted, the entire length of the output frame duration (or the frame rate of the output frame duration) needs to be equal to the entire length of the corresponding input frame duration (or, a frame rate of the corresponding input frame duration). Accordingly, the detector 452 generates the detection result signal DRS to include the length information of the blank period after outputting the active data in the sub frame duration which is additionally driven (for example, in the second sub frame duration SF2 of FIG. 7B) to supply the detection result signal to the frequency control signal generator 453. Accordingly, the frequency control signal generator 453 may generate and output the frequency control signals FCS1 and FCS2 to control the data signal and the gate signal to be output in response to the display period and the blank period of the sub frame duration which is additionally driven.

For example, as illustrated in FIG. 7B, a sum of the lengths of the first sub frame duration SF1 and the second sub frame duration SF2 may be equal to the length of the second output frame duration Fb2. That is, a sum of lengths of a display period A2*a* of the first sub frame duration SF1 in which the active data B is initially output, a display period A2*b* of the second sub frame duration SF2 in which the active data B is output thereafter, and a blank period B2 of the second sub frame duration SF2 may be equal to the length of the second output frame duration Fb2. To this end, the detector 452 generates the detection result signal DRS so as to include the length information of the blank period B2 after outputting the active data B in the second sub frame duration SF2 to supply the detection result signal DRS to the frequency control signal generator 453.

In the meantime, in FIG. 7B, it is described that a corresponding output frame duration (for example, the second output frame duration Fb2) includes two sub frame durations according to the frame rate of the input image (for example, the frame rate of the second input frame duration Fa2 in which the frame rate varies). However, it may vary depending on the length of the critical period t and the length of the frame period corresponding to the frame rate of the input frame duration in which the frame rate varies.

For example, further referring to FIG. 7C, the active data C of the third input frame duration Fa3 after the second input frame duration Fa2 is not input during the period of the critical period t (that is, when an end point of the second input frame duration Fa2 is not detected during the period of the critical period t). At this time, the detector 452 may determine (or detect) that the length of the second input frame duration Fa2 is longer than the length of the critical period t. In this case, when the output image is driven so as to correspond to the frame rate of the input image, the flicker is perceived by the user.

Accordingly, the detector 452 may generate and output the detection result signal DRS which controls the active data for (primary) image refresh to be additionally inserted. Accordingly, the frequency control signal generator 453 may generate and output the frequency control signals FCS1 and FCS2 for outputting the additional active data, based on the detection result signal DRS.

Thereafter, the detector 452 may additionally detect whether the active data C of the third input frame duration Fa3 after the second input frame duration Fa2 is input during a duration corresponding to the minimum period tmin after the duration of the critical period t. Here, as illustrated in FIG. 7C, the active data C of the third input frame duration Fa3 after the second input frame duration Fa2 is not input during the duration corresponding to the minimum period tmin after the duration of the critical period t. That is, an end point of the second input frame duration Fa2 is not detected during the duration corresponding to the minimum period tmin after the period of the critical period t. In this case, the detector 452 may generate and output the detection result signal DRS to control so as to insert the active data for additional (secondary) image refresh.

Thereafter, the detector 452 may repeatedly detect whether the active data C of the third input frame duration Fa3 after the second input frame duration Fa2 is additionally input during a duration corresponding to the minimum period tmin. Here, as illustrated in FIG. 7C, the active data C of the third input frame duration Fa3 after the second input frame duration Fa2 is input in a second duration among durations corresponding to the minimum period tmin. That is, an end point of the second input frame duration Fa2 is detected during the second duration among the durations corresponding to the minimum period tmin. In this case, the detector 452 generates and outputs the detection result signal DRS so as not to additionally insert the active data for the image refresh.

For example, as illustrated in FIG. 7C, the second output frame duration Fb2 may include a first sub frame duration SF1, a second sub frame duration SF2, and a third sub frame duration SF3. Here, the first sub frame duration SF1 is a duration in which the active data B is initially output in the second output frame duration Fb2 and has a minimum length (denoted by tref in FIG. 7C) of the above-described second output frame duration Fb2. For example, the first sub frame duration SF1 may include a display period A2*a* in which the active data B of the second output frame duration Fb2 is output. Further, the second sub frame duration SF2 may correspond to a duration in which the active data B is primarily additionally output during the second output frame duration Fb2 in accordance with the insertion of the active data B after the first sub frame duration SF1. Here, the second sub frame duration SF2 for (primary) image refresh is a minimum length to output the active data B and may have a length corresponding to the minimum period tmin of the display apparatus 1000. That is, the second sub frame duration SF2 may include the display period A2*b* in which the active data B is output. Further, the third sub frame duration SF3 may correspond to a duration in which the active data B is secondarily additionally output in the second output frame duration Fb2. In the meantime, after the third sub frame duration SF3, the third output frame duration Fa3 after the second output frame duration Fa2 is driven. Accordingly, similar to the second frame duration SF2 which has been described with reference to FIG. 7B, the third sub frame duration SF3 may include a display period A2*c* in which the active data B of the second output frame duration Fb2 is output and the blank period B2.

In the meantime, as described above, even though the active data is inserted, the entire length of the output frame duration (or the frame rate of the output frame duration) needs to be equal to the entire length of the corresponding input frame duration (or, a frame rate of the corresponding input frame duration). Accordingly, the detector 452 generates the detection result signal DRS so as to include the length information of the blank period after outputting the active data in the last sub frame duration, among sub frame durations which are additionally driven (for example, in the third sub frame duration SF3 of FIG. 7C) to supply the detection result signal to the frequency control signal generator 453. Accordingly, the frequency control signal generator 453 may generate and output the frequency control signals FCS1 and FCS2 to control the data signal and the gate signal to be output in response to the display period and the blank period of the sub frame durations which are additionally driven.

For example, as illustrated in FIG. 7C, a sum of the lengths of the first sub frame duration SF1, the second sub frame duration SF2, and the third sub frame duration SF3 may be equal to the length of the second output frame duration Fb2. That is, a sum of a display period A2*a* of the first sub frame duration SF1 in which the active data B is initially output, a display period A2*b* of the second sub frame duration SF2 in which the active data B is output thereafter, a display period A2*c* of the third sub frame duration SF3 in which the active data B is output thereafter, and a blank period B2 may be equal to the length of the second output frame duration Fb2. To this end, the detector 452 generates the detection result signal DRS so as to include the length information of the blank period B2 after outputting the active data B in the third sub frame duration SF3 which is the last sub frame duration to supply the detection result signal to the frequency control signal generator 453.

Figure 8A:
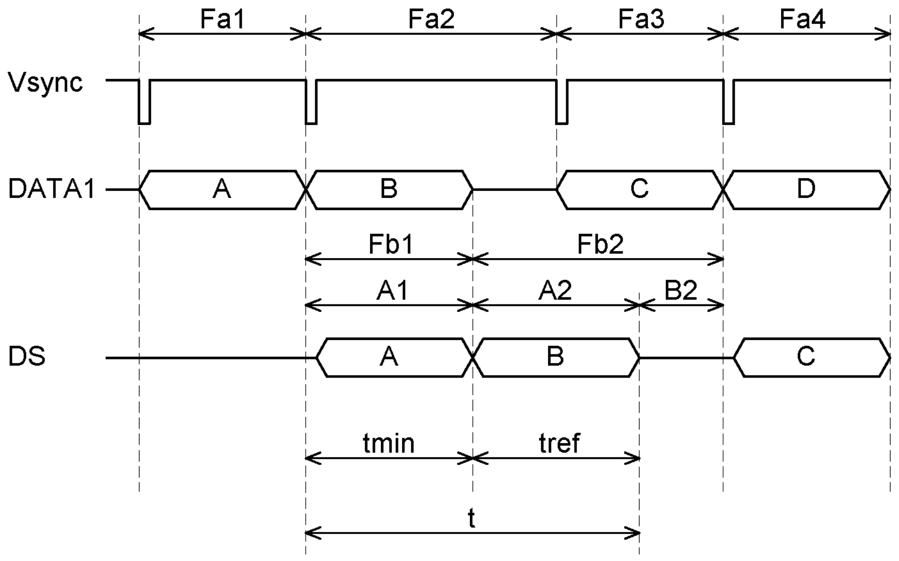
FIGS. 8A and 8B are views for explaining an example that a display apparatus of FIG. 1 is driven according to exemplary embodiments of the present disclosure.
Figure 8B:
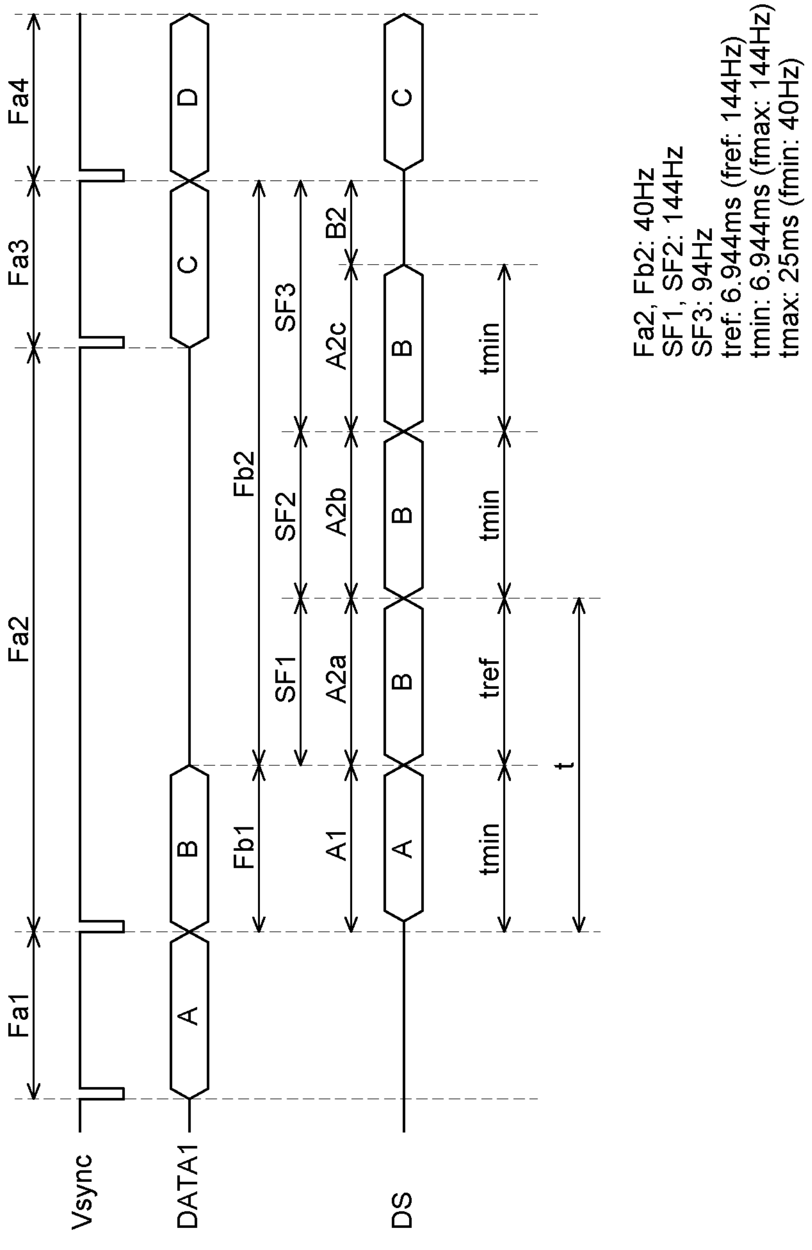

FIGS. 8A and 8B are views for explaining an example that a display apparatus of FIG. 1 is driven.

Figure 9A:
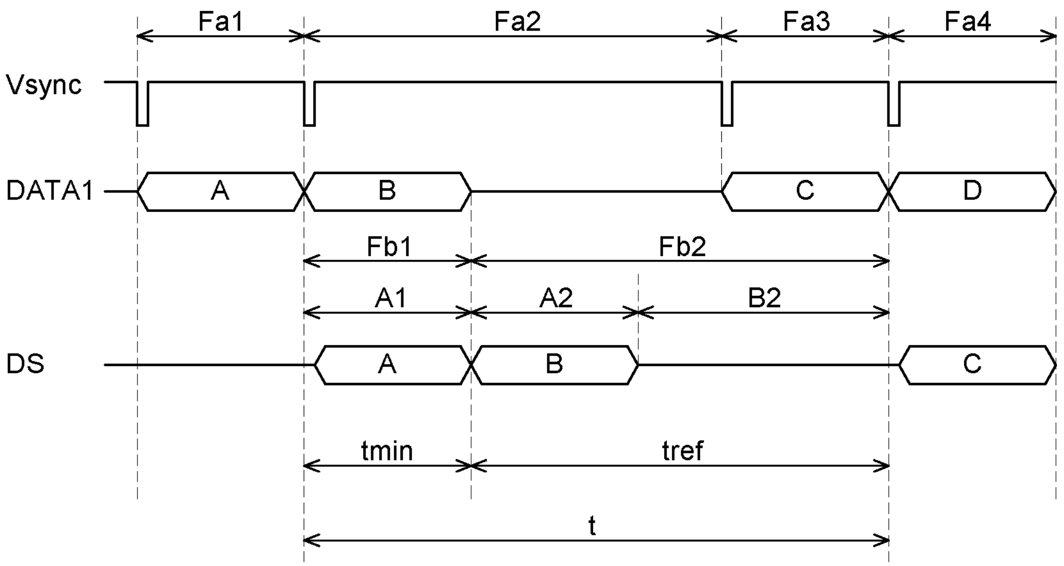
FIGS. 9A and 9B are views for explaining another example that a display apparatus of FIG. 1 is driven according to exemplary embodiments of the present disclosure.
Figure 9B:
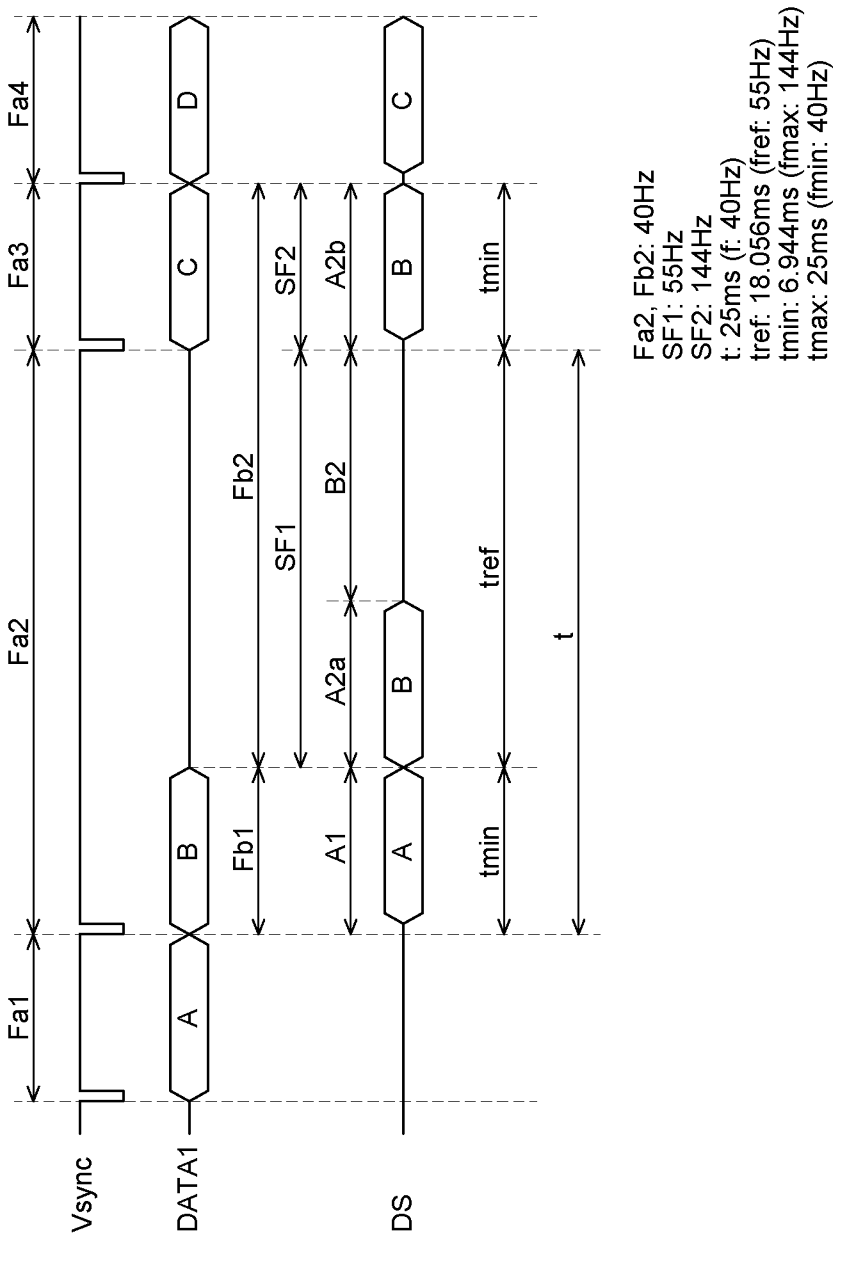

FIGS. 9A and 9B are views for explaining another example that a display apparatus of FIG. 1 is driven.

Figure 10A:
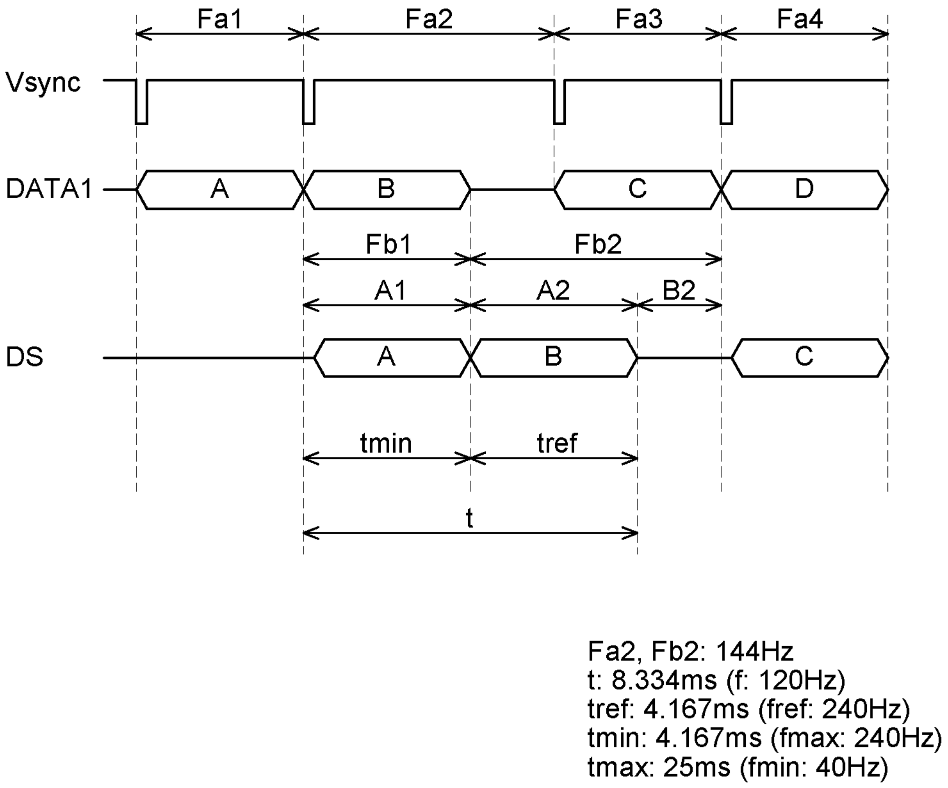
FIGS. 10A and 10B are views for explaining still another example that a display apparatus of FIG. 1 is driven according to exemplary embodiments of the present disclosure.
Figure 10B:
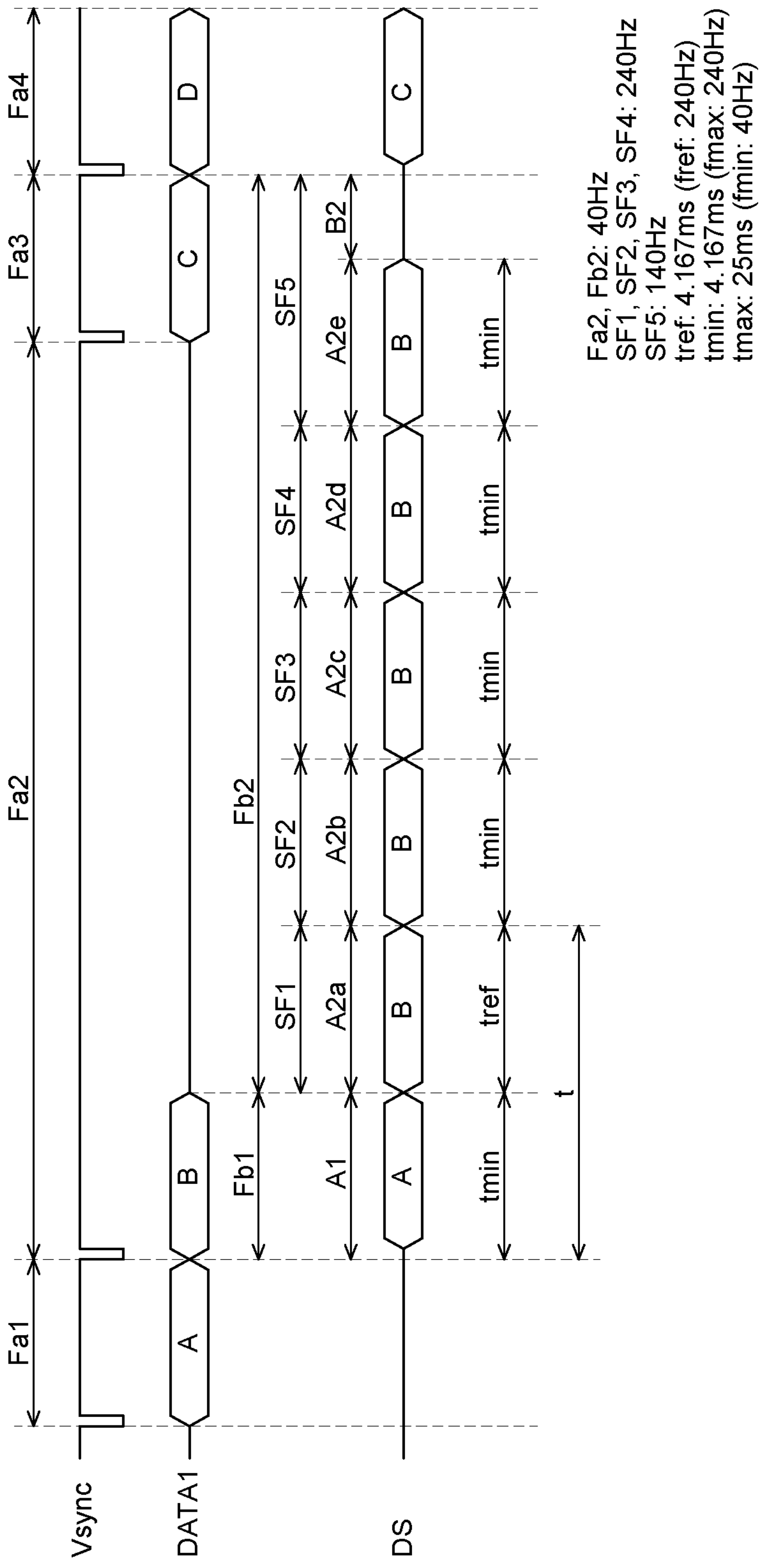

FIGS. 10A and 10B are views for explaining still another example that a display apparatus of FIG. 1 is driven.

Figure 11A:
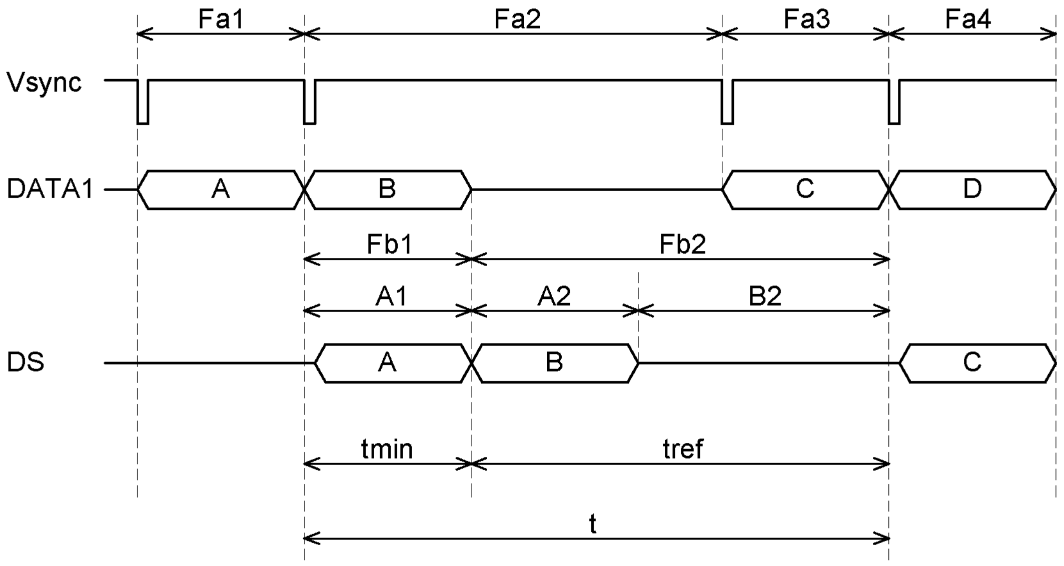
FIGS. 11A and 11B are views for explaining still another example that a display apparatus of FIG. 1 is driven according to exemplary embodiments of the present disclosure.
Figure 11B:
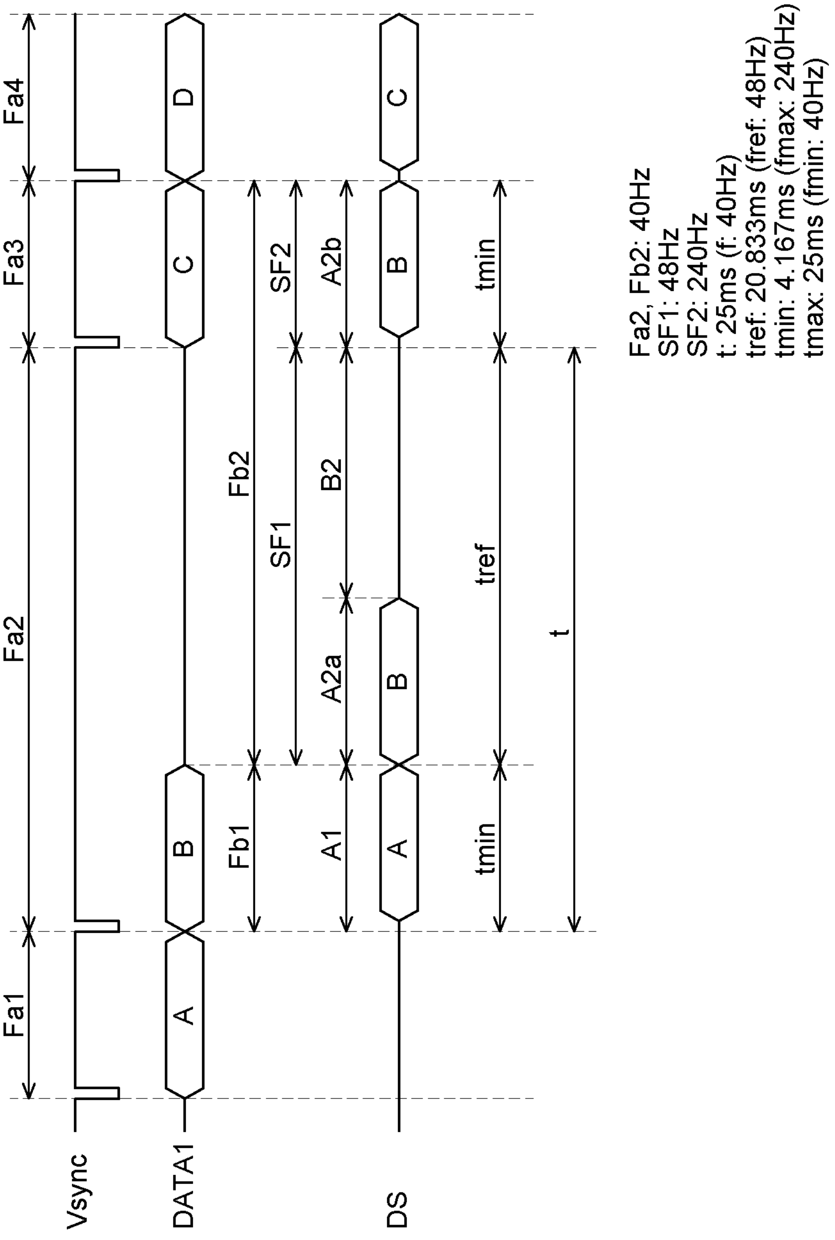

FIGS. 11A and 11B are views for explaining still another example that a display apparatus of FIG. 1 is driven.

In the meantime, in FIGS. 8A to 11B, more specific examples with regard to the exemplary embodiment in which the display apparatus 1000 according to the exemplary embodiments of the present disclosure described with reference to FIGS. 1 to 7C further inserts active data for image refresh will be described.

In the meantime, in FIGS. 8A to 11B, for the convenience of description, the description will be made with regard to a period value. However, this is just illustrative as described above so that those skilled in the art may implement an exemplary embodiment to be described below in the same way by replacing the period into the frequency.

First, referring to FIGS. 1, 4, 6, 8A, and 8B, in FIGS. 8A and 8B, the maximum frequency fmax and the minimum frequency fmin of the display apparatus 1000 are set to 144 Hz and 40 Hz, respectively (or, a minimum period tmin and a maximum period tmax for one frame in which the display apparatus 1000 is driven are set to approximately 6.994 ms and approximately 25 ms respectively). A value of the critical period t determined by the critical period determiner 451 based on the minimum period tmin and the maximum period tmax may be approximately 13.889 ms (or, a value of the critical frequency f determined based on the maximum frequency fmax and the minimum frequency fmin is 72 Hz).

First, referring to FIG. 8A, as illustrated in FIG. 8A, when the frame rate of the second input frame duration Fa2 in which the frame rate of the display apparatus 1000 varies is 80 Hz, the frame period corresponding to the frame rate may be shorter than the critical period t. The frame rate of the second input frame duration Fa2 is 80 Hz which is higher than the value of the critical frequency f of 72 Hz. In this case, the detector 452 may detect that the active data C of the third input frame duration Fa3 after the second input frame duration Fa2 is input during a period of the critical period t. Accordingly, the detector 452 generates the detection result signal DRS so as not to additionally insert the active data for image refresh. The frequency control signal generator 453 may generate and output the frequency control signals FCS1 and FCS2 to control the active data not to be additionally output based on the detection result signal DRS.

Accordingly, the second output frame duration Fb2 may be driven in the same way as the second input frame duration Fa2. For example, the data signal DS may be generated and output so that the second output frame duration Fb2 includes a display period A2 in which the active data B is output and the blank period B2. The second output frame duration Fb2 may be driven at 80 Hz, which is the same as in the first output frame duration Fb2. As described above, when the second output frame duration Fb2 is driven at 80 Hz, the blank period B2 may be approximately 5.556 ms obtained by extracting a minimum length tref of the display period A2 in which the active data B is output (in FIG. 8A, set as tref=6.944 ms) from the length of the second output frame duration Fb2.

Next, referring to FIG. 8B, as illustrated in FIG. 8B, when the frame rate of the second input frame duration Fa2 in which the frame rate of the display apparatus 1000 varies is 40 Hz, the frame period corresponding to the frame rate may be longer than the critical period t. The frame rate of the second input frame duration Fa2 is 40 Hz which is lower than the value of the critical frequency f of 72 Hz. In this case, the detector 452 may determine (or detect) that the active data C of the third input frame duration Fa3 after the second input frame duration Fa2 is not input during a period of the critical period t. Accordingly, the detector 452 generates the detection result signal DRS to control so as to additionally insert the active data for primary image refresh. The frequency control signal generator 453 may generate and output the frequency control signals FCS1 and FCS2 to control the active data to be additionally output based on the detection result signal DRS. Accordingly, in the second output frame duration Fb2, the active data B may be additionally output also during the second sub frame duration SF2 (for example, the display period A2*b* of the second sub frame duration SF2) after the first sub frame duration SF1 (for example, the display period A2*a* of the first sub frame duration SF1) in which the active data B is initially output.

Thereafter, the detector 452 may determine (or detect) whether the active data C of the third input frame duration Fa3 after the second input frame duration Fa2 is input during a duration (for example, the display period A2*b* of the second sub frame duration SF2) corresponding to the minimum period tmin after the duration of the critical period t. Here, as illustrated in FIG. 8B, even in the duration corresponding to the minimum period tmin after the duration of the critical period t, the active data C of the third input frame duration Fa3 may not be input. In other words, a length (for example, approximately 25 ms) of the frame period corresponding to the frame rate of the second input frame duration Fa2 may be longer than a sum (for example, approximately 20.832 ms) of the length of the duration of the critical period t and the length of the minimum period tmin. Accordingly, the detector 452 generates the detection result signal DRS to control so as to additionally insert the active data for secondary image refresh. The frequency control signal generator 453 may generate and output the frequency control signals FCS1 and FCS2 to control the active data to be additionally output based on the detection result signal DRS. Accordingly, in the second output frame duration Fb2, the active data B may be additionally output also in the third sub frame duration SF3 (for example, the display period A2*c* of the third sub frame duration SF3) after the first sub frame duration SF1 and the second sub frame duration SF2.

Thereafter, the detector 452 may repeatedly determine (or detect) whether the active data C of the third input frame duration Fa3 after the second input frame duration Fa2 is input during a duration (for example, the display period A2*c* of the third sub frame duration SF3) corresponding to the minimum period tmin. Here, as illustrated in FIG. 8B, in the duration corresponding to the minimum period tmin after the duration of the critical period t, the active data C of the third input frame duration Fa3 may be input. In other words, a length (for example, approximately 25 ms) of the frame period corresponding to the frame rate of the second input frame duration Fa2 may be shorter than a sum (for example, approximately 27.776 ms) of the length of the duration of the critical period t and a length of two minimum periods tmin. Accordingly, the detector 452 generates the detection result signal DRS so as not to additionally insert the active data for image refresh after the third sub frame duration SF3. The frequency control signal generator 453 may generate and output the frequency control signals FCS1 and FCS2 to control the active data not to be additionally output after the third sub frame duration SF3, based on the detection result signal DRS.

Therefore, the second output frame duration Fb2 may be driven including first to third sub frame durations SF1, SF2, and SF3. For example, in the first and second sub frame durations SF1 and SF2, the data signal DS may be generated and output so as to include display periods A2*a* and A2*b* in which the active data B is output. In the third sub frame duration SF3 which is the last sub frame duration, the data signal DS is generated and output so as to include the display period A2*c* in which the active data B is output and the blank period B2. In the meantime, the critical period t has a minimum value (for example approximately 13.889 ms which is 2*tmin) between available values (for example, values in the range of 2*tmin≤t≤tmax). Accordingly, the first sub frame duration SF1 which is an initial sub frame duration may have a length corresponding to the length of the minimum period tmin.

Here, as described with reference to FIGS. 7A to 7C, the length of the blank period B2 of the third sub frame duration SF3 which is the last sub frame duration may be determined such that a sum of the lengths of the first to third sub frame durations SF1, SF2, and SF3 corresponding to the length of the second output frame duration Fb2 is equal to the length of the second input frame duration Fa2. For example, the first sub frame duration SF1 and the second sub frame duration SF2, including only the display period A2*a* or A2*b* in which the active data B is output, are driven at 144 Hz which is the same as the maximum frequency fmax corresponding to the minimum period tmin. The length of the blank period B2 may be determined such that the third sub frame duration SF3 including the display period A2*c* in which the active data B is output and the blank period B2 is driven at 94 Hz. As described above, when the second output frame duration Fb2 is driven at 40 Hz and the third sub frame duration SF3 including the blank period B2 is driven at 94 Hz, the blank period B2 may be approximately 3.694 ms obtained by extracting the minimum length tref of the display period A2*a* in which the active data B is output (trf is set to be 6.944 ms in FIG. 8B) from the length of the third sub frame duration SF3.

Next, referring to FIGS. 1, 4, 6, 9A, and 9B, in FIGS. 9A and 9B, the maximum frequency fmax and the minimum frequency fmin of the display apparatus 1000 are set to 144 Hz and 40 Hz (or, a minimum period tmin and a maximum period tmax for one frame in which the display apparatus 1000 is driven are set to approximately 6.994 ms and approximately 25 ms respectively), respectively. A value of the critical period t determined by the critical period determiner 451 based on the minimum period tmin and the maximum period tmax may be approximately 25 ms (or, a value of the critical frequency f determined based on the maximum frequency fmax and the minimum frequency fmin is 40 Hz).

First, referring to FIG. 9A, as illustrated in FIG. 9A, when the frame rate of the second input frame duration Fa2 in which the frame rate of the display apparatus 1000 varies is 50 Hz, the frame period corresponding to the frame rate may be shorter than the critical period t. The frame rate of the second input frame duration Fa2 is 50 Hz which is higher than the value of the critical frequency f of 40 Hz. In this case, the detector 452 may detect that the active data C of the third input frame duration Fa3 after the second input frame duration Fa2 is input during a period of the critical period t. Accordingly, the detector 452 generates the detection result signal DRS so as not to additionally insert the active data for image refresh. The frequency control signal generator 453 may generate and output the frequency control signals FCS1 and FCS2 to control the active data not to be additionally output based on the detection result signal DRS.

Accordingly, the second output frame duration Fb2 may be driven in the same way as the second input frame duration Fa2. For example, the data signal DS may be generated and output so that the second output frame duration Fb2 includes a display period A2 in which the active data B is output and the blank period B2. The second output frame duration Fb2 may be driven at 50 Hz, which is the same as in the first output frame duration Fb2.

Next, referring to FIG. 9B, as illustrated in FIG. 9B, when the frame rate of the second input frame duration Fa2 in which the frame rate of the display apparatus 1000 varies is 40 Hz, the frame period corresponding to the frame rate may be equal to or longer than the critical period t. The frame rate of the second input frame duration Fa2 is 40 Hz which is equal to or higher than the value of the critical frequency f of 40 Hz. In this case, the detector 452 may determine (or, detect) that the active data C of the third input frame duration Fa3 after the second input frame duration Fa2 is not input during a period of the critical period t. Accordingly, the detector 452 generates the detection result signal DRS to control so as to additionally insert the active data for primary image refresh. The frequency control signal generator 453 may generate and output the frequency control signals FCS1 and FCS2 to control the active data to be additionally output based on the detection result signal DRS. Accordingly, in the second output frame duration Fb2, the active data B may be additionally output in the second sub frame duration SF2 (for example, the display period A2*b* of the second sub frame duration SF2) after the first sub frame duration SF1 (for example, the display period A2*a* and the blank period B2 of the first sub frame duration SF1) in which the active data B is initially output.

Thereafter, the detector 452 may determine (or detect) whether the active data C of the third input frame duration Fa3 after the second input frame duration Fa2 is input during a duration (for example, the display period A2*b* of the second sub frame duration SF2) corresponding to the minimum period tmin after the duration of the critical period t. Here, as illustrated in FIG. 9B, in the duration corresponding to the minimum period tmin after the duration of the critical period t, the active data C of the third input frame duration Fa3 may be input. In other words, a length (for example, approximately 25 ms) of the frame period corresponding to the frame rate of the second input frame duration Fa2 may be shorter than a sum (for example, approximately 31.944 ms) of the length of the duration of the critical period t and a length of one minimum period tmin. Accordingly, the detector 452 generates the detection result signal DRS so as not to additionally insert the active data for image refresh after the second sub frame duration SF2. The frequency control signal generator 453 may generate and output the frequency control signals FCS1 and FCS2 to control the active data not to be additionally output after the second sub frame duration SF2, based on the detection result signal DRS.

Therefore, the second output frame duration Fb2 may be driven including first and second sub frame durations SF1 and SF2. For example, in the first sub frame duration SF1, the data signal DS may be generated and output so as to include display periods A2*a* in which the active data B is output and the blank period B2. In the second sub frame duration SF2 which is the last sub frame duration, the data signal DS may be generated and output so as to include the display period A2*b* in which the active data B is output. In the meantime, the critical period t has a value (for example, approximately 25 ms which is tmax) which is equal to or larger than a minimum value (for example approximately 13.889 ms which is 2*tmin) between available values (for example, values in the range of 2*tmin≤t≤tmax). Therefore, the first sub frame duration SF1 includes the display period A2*a* and the blank period B2 having a length corresponding to the length of the minimum period tmin so that the first sub frame duration SF1 which is an initial sub frame duration may have a minimum length (for example, tref) of the output frame duration (that is, the second output frame duration Fb2). That is, the length of the display period A2*a* is fixed to the length of the minimum period tmin so that the length of the blank period B2 of the first sub frame duration SF1 may be determined in accordance with the minimum length (for example, tref) of the output frame duration (that is, the second output frame duration Fb2).

Further, as described with reference to FIGS. 7A to 7C, the length of the blank period of the second sub frame duration SF2 which is the last sub frame duration may be determined such that a sum of the lengths of the first and second sub frame durations SF1 and SF2 corresponding to the length of the second output frame duration Fb2 is equal to the length of the second input frame duration Fa2. Here, the length of the first sub frame duration SF1 is approximately 18.056 ms which is the minimum length (for example, tref) of the output frame duration (that is, the second output frame duration Fb2) (or, the first sub frame duration SF1 is driven at 55 Hz), so that the second sub frame duration SF2 may be driven including only the display period A2*b* without the blank period. For example, the first sub frame duration SF1 including the display period A2*a* in which the active data B is output and the blank period B2 is driven at 55 Hz and the second sub frame duration SF2 including only the display period A2*b* in which the active data B is output may be driven at 144 Hz which is equal to the maximum frequency fmax corresponding to the minimum period tmin.

First, referring to FIGS. 1, 4, 6, 10A, and 10B, in FIGS. 10A and 10B, the maximum frequency fmax and the minimum frequency fmin of the display apparatus 1000 are set to 240 Hz and 40 Hz (or, a minimum period tmin and a maximum period tmax for one frame in which the display apparatus 1000 is driven are set to approximately 4.167 ms and approximately 25 ms respectively), respectively. A value of the critical period t determined by the critical period determiner 451 based on the minimum period tmin and the maximum period tmax may be approximately 8.334 ms (or, a value of the critical frequency f determined based on the maximum frequency fmax and the minimum frequency fmin is 120 Hz).

First, referring to FIG. 10A, as illustrated in FIG. 10A, when the frame rate of the second input frame duration Fa2 in which the frame rate of the display apparatus 1000 varies is 144 Hz, the frame period corresponding to the frame rate may be shorter than the critical period t. The frame rate of the second input frame duration Fa2 is 144 Hz which is higher than the value of the critical frequency f of 120 Hz. In this case, the detector 452 detects that the active data C of the third input frame duration Fa3 after the second input frame duration Fa2 is input during a period of the critical period t. Accordingly, the detector 452 generates the detection result signal DRS so as not to additionally insert the active data for image refresh. The frequency control signal generator 453 may generate and output the frequency control signals FCS1 and FCS2 to control the active data not to be additionally output based on the detection result signal DRS.

Accordingly, the second output frame duration Fb2 may be driven in the same way as the second input frame duration Fa2. For example, the data signal DS may be generated and output so that the second output frame duration Fb2 includes a display period A2 in which the active data B is output and the blank period B2. The second output frame duration Fb2 may be driven at 144 Hz, which is the same as in the first output frame duration Fb2.

Next, referring to FIG. 10B, as illustrated in FIG. 10B, when the frame rate of the second input frame duration Fa2 in which the frame rate of the display apparatus 1000 varies is 40 Hz, the frame period corresponding to the frame rate may be longer than the critical period t. The frame rate of the second input frame duration Fa2 is 40 Hz which is lower than the value of the critical frequency f of 120 Hz. In this case, the detector 452 may determine (or, detect) that the active data C of the third input frame duration Fa3 after the second input frame duration Fa2 is not input during a period of the critical period t. Accordingly, the detector 452 generates the detection result signal DRS to control so as to additionally insert the active data for primary image refresh. The frequency control signal generator 453 may generate and output the frequency control signals FCS1 and FCS2 to control the active data to be additionally output based on the detection result signal DRS. Accordingly, in the second output frame duration Fb2, the active data B may be additionally output in the second sub frame duration SF2 (for example, the display period A2*b* of the second sub frame duration SF2) after the first sub frame duration SF1 (for example, the display period A2*a* of the first sub frame duration SF1) in which the active data B is initially output.

Thereafter, similar to the above description, the detector 452 may repeatedly determine (or detect) whether the active data C of the third input frame duration Fa3 after the second input frame duration Fa2 is input during a duration (for example, the display period A2*b* of the second sub frame duration SF2) corresponding to the minimum period tmin. Here, as illustrated in FIG. 10B, the active data C of the third input frame duration Fa3 may be input in the duration in which the active data C of the third input frame duration Fa3 is input (for example, a duration corresponding to the display period A2*e* of the fifth sub frame duration SF5). In other words, a sum (for example, approximately 25 ms) of the length of a period of the critical period t and a length of fourth minimum periods tmin may be equal to or longer than a length (for example, approximately 25 ms) of the frame period corresponding to the frame rate of the second input frame duration Fa2. Accordingly, the detector 452 generates the detection result signal DRS so as not to additionally insert the active data for image refresh after the fifth sub frame duration SF5. The frequency control signal generator 453 may generate and output the frequency control signals FCS1 and FCS2 to control the active data not to be additionally output after the fifth sub frame duration SF5, based on the detection result signal DRS.

Therefore, the second output frame duration Fb2 may be driven including first to fifth sub frame durations SF1 to SF5. For example, in the first to fourth sub frame durations SF1 to SF4, the data signal DS may be generated and output so as to include display periods A2*a*, A2*b*, A2*c*, and A2*d* in which the active data B is output. In the fifth sub frame duration SF5 which is the last sub frame duration, the data signal DS may be generated and output so as to include the display period A2*e* in which the active data B is output and the blank period B2. In the meantime, the critical period t has a minimum value (for example approximately 8.334 ms which is 2*tmin) between available values (for example, values in the range of 2*tmin≤t≤tmax). Accordingly, the first sub frame duration SF1 which is an initial sub frame duration may have a length corresponding to the length of the minimum period tmin.

Here, as described above with reference to FIGS. 7A to 7C, the length of the blank period B2 of the fifth sub frame duration SF5 which is the last sub frame duration is determined such that a sum of the lengths of the first to fifth sub frame durations SF1 to SF5 corresponding to the length of the second output frame duration Fb2 is equal to the length of the second input frame duration Fa2. For example, the first to fourth sub frame duration SF1 to SF4 includes only the display period A2*a*, A2*b*, A2*c*, and A2*d* in which the active data B is output. The first to fourth sub frame duration SF1 to SF4 are driven at 240 Hz which is the same as the maximum frequency fmax corresponding to the minimum period tmin. The length of the blank period B2 is determined such that the fifth sub frame duration SF5 including the display period A2*e* in which the active data B is output and the blank period B2 is driven at 140 Hz.

Next, referring to FIGS. 1, 4, 6, 11A, and 11B, in FIGS. 11A and 11B, the maximum frequency fmax and the minimum frequency fmin of the display apparatus 1000 are set to 240 Hz and 40 Hz (or, a minimum period tmin and a maximum period tmax for one frame in which the display apparatus 1000 is driven are set to approximately 4.167 ms and approximately 25 ms respectively), respectively. A value of the critical period t determined by the critical period determiner 451 based on the minimum period tmin and the maximum period tmax may be approximately 25 ms (or, a value of the critical frequency f determined based on the maximum frequency fmax and the minimum frequency fmin is 40 Hz).

First, referring to FIG. 10A, as illustrated in FIG. 10A, when the frame rate of the second input frame duration Fa2 in which the frame rate of the display apparatus 1000 varies is 50 Hz, the frame period corresponding to the frame rate may be shorter than the critical period t. The frame rate of the second input frame duration Fa2 is 50 Hz which is higher than the value of the critical frequency f of 40 Hz. In this case, the detector 452 detects that the active data C of the third input frame duration Fa3 after the second input frame duration Fa2 is input during a period of the critical period t. Accordingly, the detector 452 generates the detection result signal DRS so as not to additionally insert the active data for image refresh. The frequency control signal generator 453 may generate and output the frequency control signals FCS1 and FCS2 to control the active data not to be additionally output based on the detection result signal DRS.

Accordingly, the second output frame duration Fb2 may be driven in the same way as the second input frame duration Fa2. For example, the data signal DS may be generated and output so that the second output frame duration Fb2 includes a display period A2 in which the active data B is output and the blank period B2. The second output frame duration Fb2 may be driven at 50 Hz, which is the same as in the first output frame duration Fb2.

Next, referring to FIG. 11B, as illustrated in FIG. 11B, when the frame rate of the second input frame duration Fa2 in which the frame rate of the display apparatus 1000 varies is 40 Hz, the frame period corresponding to the frame rate may be equal to or longer than the critical period t. The frame rate of the second input frame duration Fa2 is 40 Hz which is equal to or higher than the value of the critical frequency f of 40 Hz. In this case, the detector 452 may determine (or detect) that the active data C of the third input frame duration Fa3 after the second input frame duration Fa2 is not input during a period of the critical period t. Accordingly, the detector 452 generates the detection result signal DRS to control so as to additionally insert the active data for primary image refresh. The frequency control signal generator 453 may generate and output the frequency control signals FCS1 and FCS2 to control the active data to be additionally output based on the detection result signal DRS. Accordingly, in the second output frame duration Fb2, the active data B may be additionally output in the second sub frame duration SF2 (for example, the display period A2*b* of the second sub frame duration SF2) after the first sub frame duration SF1 (for example, the display period A2*a* and the blank period B2 of the first sub frame duration SF1) in which the active data B is initially output.

Thereafter, the detector 452 may determine (or detect) whether the active data C of the third input frame duration Fa3 after the second input frame duration Fa2 is input during a duration (for example, the display period A2*b* of the second sub frame duration SF2) corresponding to the minimum period tmin after the duration of the critical period t. Here, as illustrated in FIG. 11B, in the duration corresponding to the minimum period tmin after the duration of the critical period t, the active data C of the third input frame duration Fa3 may be input. In other words, a sum of the length of the duration of the critical period t and a length of one minimum period tmin (for example, approximately 25 ms) may be equal to or longer than a length (for example, approximately 25 ms) of the frame period corresponding to the frame rate of the second input frame duration Fa2. Accordingly, the detector 452 generates the detection result signal DRS after the second sub frame duration SF2 so as not to additionally insert the active data for image refresh. The frequency control signal generator 453 may generate and output the frequency control signals FCS1 and FCS2 to control the active data not to be additionally output after the second sub frame duration SF2, based on the detection result signal DRS.

Therefore, the second output frame duration Fb2 may be driven including first and second sub frame durations SF1 and SF2. For example, in the first sub frame duration SF1, the data signal DS may be generated and output so as to include display periods A2*a* in which the active data B is output and the blank period B2. In the second sub frame duration SF2 which is the last sub frame duration, the data signal DS may be generated and output so as to include the display period A2*b* in which the active data B is output. In the meantime, the critical period t has a value (for example, approximately 25 ms which is tmax) which is equal to or larger than a minimum value (for example, approximately 8.334 ms which is 2*tmin) between available values (for example, values in the range of 2*tmin≤t≤tmax). Therefore, the first sub frame duration SF1 may include the display period A2*a* and the blank period B2 having a length corresponding to the length of the minimum period tmin so that the first sub frame duration SF1 which is an initial sub frame duration may have a minimum length (for example, tref) of the output frame duration (that is, the second output frame duration Fb2). That is, the length of the display period A2*a* is fixed to the length of the minimum period tmin so that the length of the blank period B2 of the first sub frame duration SF1 may be determined in accordance with the minimum length (for example, tref) of the output frame duration (that is, the second output frame duration Fb2).

Further, as described with reference to FIGS. 7A to 7C, the length of the blank period of the second sub frame duration SF2 which is the last sub frame duration may be determined such that a sum of the lengths of the first and second sub frame durations SF1 and SF2 corresponding to the length of the second output frame duration Fb2 is equal to the length of the second input frame duration Fa2. Here, the length of the first sub frame duration SF1 is approximately 20.833 ms which is the minimum length (for example, tref) of the output frame duration (that is, the second output frame duration Fb2) (or the first sub frame duration SF1 is driven at 48 Hz), so that the second sub frame duration SF2 may be driven including only the display period A2*b* without the blank period. For example, the first sub frame duration SF1 including the display period A2*a* in which the active data B is output and the blank period B2 is driven at 48 Hz and the second sub frame duration SF2 including only the display period A2*b* in which the active data B is output may be driven at 240 Hz which is equal to the maximum frequency fmax corresponding to the minimum period tmin.

Figure 12:
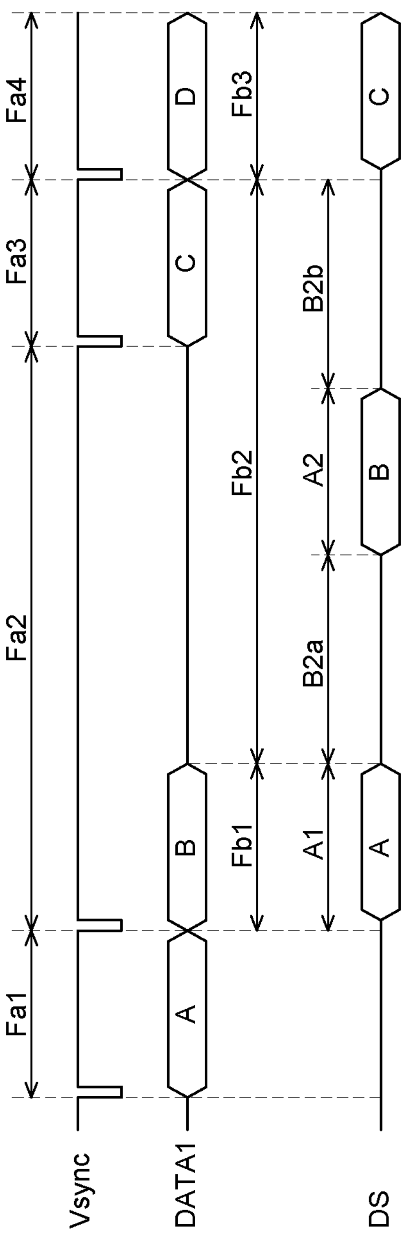
FIG. 12 is a view illustrating another example of a driving method of a timing controller of FIG. 4 according to exemplary embodiments of the present disclosure.

FIG. 12 is a view illustrating another example of a driving method of a timing controller of FIG. 4.

In the meantime, FIG. 12 illustrates a modified embodiment of the exemplary embodiment which has been described with reference to FIGS. 7A to 7C, with regard to the output of the active data. In order to avoid the redundant description, the differences from the above-described exemplary embodiment will be mainly described and parts which will not be specifically described may follow the above-described exemplary embodiment. Like reference numerals denote like components.

Referring to FIGS. 1, 4, 6, and 12, in FIG. 12, the vertical synchronization signal Vsync corresponding to the input frame durations Fa1, Fa2, and Fa3, and Fa4 of the input image and the data signal DS corresponding to the output frame periods Fb1, Fb2, and Fb3 of the output image are illustrated.

As described with reference to FIGS. 1 to 7C, the timing controller 400 may generate the timing control signal DCS and the gate control signal GCS to control the data signal DS and the gate signal to be output during the output frame durations Fb1, Fb2, and Fb3. Here, each of output frame durations Fb1, Fb2, and Fb3 may include display periods in which the active data is output and may selectively include a blank period after the display period included according to the frame rate of the corresponding output frame duration.

In one exemplary embodiment, as illustrated in FIG. 12, the blank period of the output frame durations Fb1, Fb2, and Fb3 may be included before and/or after the display period. In other words, the active data (for example, the active data B of the second output frame duration Fb2) of the data signal DS may be output in the output frame duration such that the blank period (for example, B2*a* or B2*b*) of the output frame durations Fb1, Fb2, and Fb3 may be disposed before or after the display period (for example, A2) in which the active data (for example, the active data B of the second output frame duration Fb2) is output.

As described above, according to exemplary embodiments of the present disclosure, the display apparatus detects a frame period corresponding to a frame rate for an input image and compares the detected frame period (or a frame rate) of the input image and a critical period (or, a critical frequency). When the detected frame period is longer than the critical period, a sub frame period for outputting active data for an image refresh may be inserted in the output frame period. Accordingly, reduction of charges charged in the pixel during a blank period in response to various frame rates may be suppressed. In other words, the degradation in the luminance of the displayed image in accordance with the reduction in the frame rate of the input image (or the frame period of the input image is increased) may be suppressed.

The exemplary embodiments of the present disclosure can also be described as follows:

According to an aspect of the present disclosure, there is provided a display apparatus. The display apparatus includes a display panel which includes a plurality of pixels. The display apparatus further includes a timing controller which generates image data, a data control signal, and a gate control signal, based on an input image signal and an input control signal for an input image. The display apparatus further includes a data driver which generates a data signal for an output image based on the image data and the data control signal and supplies the data signal to the pixels. The display apparatus further includes a gate driver which generates a gate signal based on the gate control signal and supplies the gate signal for the output image to the pixels. The timing controller detects a frame period corresponding to a frame rate of the input image and compares the detected frame period and a critical period, and when the detected frame period is longer than the critical period, inserts a sub frame duration to output active data for image refresh after outputting active data of an output frame duration corresponding to the output image.

The output frame duration corresponding to the output image may be delayed by a predetermined duration from an input frame duration corresponding to the input image.

The critical period may be determined based on a maximum period and a minimum period of the frame period.

The critical period may be determined within the range of twice the minimum period to the maximum period.

When an end point of the input frame duration corresponding to the input image is not detected during a period corresponding to the critical period, the timing controller may insert the sub frame duration into the output frame duration.

When the end point of the input frame duration corresponding to the input image is not detected during a period corresponding to the minimum period after the period corresponding to the critical period, the timing controller may further insert the sub frame duration in the output frame duration. When an end point of the input frame duration corresponding to the input image is detected during a period corresponding to the critical period, the timing controller may not insert the sub frame duration in the output frame duration.

The timing controller may detect an end point of the input frame duration depending on whether active data of an input frame duration after the input frame duration is input during a period corresponding to the critical period based on the input image signal.

The timing controller may detect an end point of the input frame duration depending on whether a pulse of a vertical synchronization signal which is included in the input control signal is applied during the period corresponding to the critical period based on the vertical synchronization signal.

When the sub frame duration is inserted in the output frame duration, the output frame duration may include a plurality of sub frame durations each including a display period for outputting the active data.

The active data which is output during the plurality of sub frame durations may include the same active data.

At least one sub frame duration, among the plurality of sub frame durations may further include a blank period.

A length of the blank period may be determined based on the detected frame period.

A sum of the length of the blank period and lengths of the display periods included in the plurality of sub frame durations may correspond to a length of the detected frame period.

The timing controller may include: a frame memory which stores the input image signal: an image signal processor which converts the input image signal output from the frame memory into the image data: a control signal generator which generates the data control signal and the gate control signal based on the input control signal: and a refresh rate controller which generates a first frequency control signal for controlling the control signal generator and a second frequency control signal for controlling the image signal processor.

The frame memory may store the input image signal and delay the input image signal by the predetermined duration to output the delayed input image signal.

Output frequencies of the data control signal and the gate control signal which are output from the control signal generator may be determined based on the first frequency control signal. An output frequency of the image data output from the image signal processor may be determined based on the second frequency control signal.

The refresh rate controller may include: a critical period determiner which determines the critical period based on the maximum period and the minimum period of the frame period to generate critical period information: a detector which detects the frame period corresponding to the frame rate of the input image and compares the detected frame period and the critical period based on the critical period information to generate a detection result signal; and a frequency control signal generator which generates the first frequency control signal and the second frequency control signal in response to the detection result signal.

The critical period may be determined by the input of a user.

The critical period may be a predetermined value.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display apparatus, comprising:
- a display panel including a plurality of pixels;
- a timing controller configured to generate image data, a data control signal, and a gate control signal based on an input image signal and an input control signal for an input image;
- a data driver configured to generate a data signal for an output image based on the image data and the data control signal and supplies the data signal to the plurality of pixels; and
- a gate driver configured to generate a gate signal based on the gate control signal and supply the gate signal for the output image to the plurality of pixels,
- wherein the timing controller is further configured to:
  - detect a frame period corresponding to a frame rate of the input image,
  - compare the detected frame period and a critical period, and
  - responsive to determining that the detected frame period is longer than the critical period based on the comparison, insert a sub frame duration to output active data for image refresh after outputting active data of an output frame duration corresponding to the output image.

2. The display apparatus according to claim 1, wherein the output frame duration corresponding to the output image is delayed by a predetermined duration from an input frame duration corresponding to the input image.

3. The display apparatus according to claim 2, wherein the critical period is determined based on a maximum period and a minimum period of the frame period.

4. The display apparatus according to claim 3, wherein the critical period is determined within a range between twice the minimum period and the maximum period.

5. The display apparatus according to claim 3, wherein responsive to an end point of the input frame duration corresponding to the input image not being detected during a period corresponding to the critical period, the timing controller inserts the sub frame duration into the output frame duration.

6. The display apparatus according to claim 5, wherein responsive to an end point of the input frame duration corresponding to the input image not being detected during a period corresponding to the minimum period after the period corresponding to the critical period, the timing controller further inserts the sub frame duration in the output frame duration.

7. The display apparatus according to claim 3, wherein responsive to an end point of the input frame duration corresponding to the input image being detected during a period corresponding to the critical period, the timing controller does not insert the sub frame duration in the output frame duration.

8. The display apparatus according to claim 5, wherein the timing controller detects an end point of the input frame duration depending on whether active data of an input frame duration after the input frame duration is input during a period corresponding to the critical period based on the input image signal.

9. The display apparatus according to claim 5, wherein the timing controller detects an end point of the input frame duration depending on whether a pulse of a vertical synchronization signal which is included in the input control signal is applied during the period corresponding to the critical period based on the vertical synchronization signal.

10. The display apparatus according to claim 3, wherein when the sub frame duration is inserted in the output frame duration, the output frame duration includes a plurality of sub frame durations each including a display period for outputting the active data.

11. The display apparatus according to claim 10, wherein the active data which is output during the plurality of sub frame durations includes the same active data.

12. The display apparatus according to claim 10, wherein at least one sub frame duration, among the plurality of sub frame durations further includes a blank period.

13. The display apparatus according to claim 12, wherein a length of the blank period is determined based on the detected frame period.

14. The display apparatus according to claim 13, wherein a sum of the length of the blank period and lengths of the display periods included in the plurality of sub frame durations corresponds to a length of the detected frame period.

15. The display apparatus according to claim 3, wherein the timing controller includes:
- a frame memory configured to store the input image signal;
- an image signal processor configured to convert the input image signal output from the frame memory into the image data;
- a control signal generator configured to generate the data control signal and the gate control signal based on the input control signal; and
- a refresh rate controller configured to generate a first frequency control signal for controlling the control signal generator and a second frequency control signal for controlling the image signal processor.

16. The display apparatus according to claim 15, wherein the frame memory is configured to store the input image signal and delay the input image signal by the predetermined duration to output the delayed input image signal.

17. The display apparatus according to claim 15, wherein output frequencies of the data control signal and the gate control signal which are output from the control signal generator are determined based on the first frequency control signal, and an output frequency of the image data output from the image signal processor is determined based on the second frequency control signal.

18. The display apparatus according to claim 15, wherein the refresh rate controller includes:

a critical period determiner circuit configured to determine the critical period based on the maximum period and the minimum period of the frame period to generate critical period information;

a detector circuit configured to detect the frame period corresponding to the frame rate of the input image and compare the detected frame period and the critical period based on the critical period information to generate a detection result signal; and a frequency control signal generator circuit configured to generate the first frequency control signal and the second frequency control signal in response to the detection result signal.

19. The display apparatus according to claim 18, wherein the critical period is determined by the input of a user.

20. The display apparatus according to claim 18, wherein the critical period is a predetermined value.

* * * * *